(12) United States Patent
Kosaka et al.

(10) Patent No.: US 11,988,226 B2
(45) Date of Patent: May 21, 2024

(54) CENTRIFUGAL BLOWER

(71) Applicant: DENSO CORPORATION, Kariya (JP)

(72) Inventors: Sho Kosaka, Kariya (JP); Shuzo Oda, Kariya (JP)

(73) Assignee: DENSO CORPORATION, Kariya (JP)

( * ) Notice: Subject to any disclaimer, the term of this patent is extended or adjusted under 35 U.S.C. 154(b) by 410 days.

(21) Appl. No.: 17/317,957

(22) Filed: May 12, 2021

(65) Prior Publication Data

US 2021/0262485 A1 Aug. 26, 2021

Related U.S. Application Data

(63) Continuation of application No. PCT/JP2019/039149, filed on Oct. 3, 2019.

(30) Foreign Application Priority Data

Nov. 19, 2018 (JP) .................................. 2018-216354

(51) Int. Cl.
*F04D 29/42* (2006.01)
*B60H 1/00* (2006.01)
(Continued)

(52) U.S. Cl.
CPC ......... *F04D 29/4213* (2013.01); *F04D 17/10* (2013.01); *F04D 25/08* (2013.01);
(Continued)

(58) Field of Classification Search
CPC .. F04D 17/162; F04D 29/424; F04D 29/4213; F04D 29/422; F04D 29/4226;
(Continued)

(56) References Cited

U.S. PATENT DOCUMENTS

2003/0190230 A1 10/2003 Ito
2016/0355069 A1 12/2016 Vincent
(Continued)

FOREIGN PATENT DOCUMENTS

DE 102016225038 A1 3/2018
EP 3524452 A1 8/2019
(Continued)

*Primary Examiner* — Christopher Verdier
(74) *Attorney, Agent, or Firm* — Harness, Dickey & Pierce, P.L.C.

(57) ABSTRACT

A centrifugal blower includes a box, a filter, an impeller, a scroll casing, a bell mouth, a partition wall, and a separation tube. The scroll casing defines an air passage gradually increasing from a nose portion in a circumferential direction. The partition wall divides the air passage into an upper passage and a lower passage. The separation tube includes an air introducing plate to partially cover the impeller and defining an air inlet portion and a tubular portion that extends from the air inlet portion through the impeller. On a virtual plane parallel to a rotational axis of the impeller, an outer edge of the air introducing plate extends and a passage between the filter and the upper passage is divided by the separation tube into a first passage cross-section closer to the nose portion and a second passage cross-section that is smaller than the first passage cross-section.

11 Claims, 18 Drawing Sheets

(51) Int. Cl.
  *F04D 17/10* (2006.01)
  *F04D 17/16* (2006.01)
  *F04D 25/08* (2006.01)
  *F04D 29/44* (2006.01)
  *F04D 29/70* (2006.01)

(52) U.S. Cl.
  CPC ....... *F04D 29/4226* (2013.01); *F04D 29/441* (2013.01); *F04D 29/703* (2013.01); *B60H 2001/00085* (2013.01); *B60H 1/00471* (2013.01); *F04D 17/162* (2013.01); *F04D 29/424* (2013.01)

(58) Field of Classification Search
  CPC .... F04D 29/282; F04D 29/441; F04D 29/703; F04D 25/08; B60H 2001/00085; B60H 1/00471; B60H 1/00821; B60H 1/00828
  See application file for complete search history.

(56) References Cited

U.S. PATENT DOCUMENTS

| | | |
|---|---|---|
| 2018/0072131 A1 | 3/2018 | Lee et al. |
| 2019/0293081 A1 | 9/2019 | Imahigashi et al. |
| 2019/0293082 A1 | 9/2019 | Imahigashi et al. |
| 2021/0215359 A1* | 7/2021 | Nagata ................ F24F 1/38 |
| 2021/0239128 A1* | 8/2021 | Kosaka ............. B60H 1/00021 |

FOREIGN PATENT DOCUMENTS

| | | |
|---|---|---|
| JP | 2000203235 A | 7/2000 |
| JP | 2001032799 A | 2/2001 |
| JP | 2002019445 A | 1/2002 |
| JP | 2002276880 A | 9/2002 |
| JP | 2003301794 A | 10/2003 |
| JP | 2004132342 A | 4/2004 |
| JP | 3858744 B2 | 12/2006 |
| JP | 2017505397 A | 2/2017 |
| JP | 2017227213 A | 12/2017 |
| JP | 2017538886 A | 12/2017 |
| JP | 2018035791 A | 3/2018 |
| JP | 2018035792 A | 3/2018 |
| JP | 6313859 B2 | 4/2018 |
| JP | 2018091274 A | 6/2018 |
| JP | 2018109383 A | 7/2018 |
| JP | 2019173570 A | 10/2019 |
| JP | 2019173571 A | 10/2019 |
| JP | 2020016229 A | 1/2020 |
| JP | 2020016233 A | 1/2020 |
| WO | WO-2017103358 A1 | 6/2017 |
| WO | WO-2018074339 A1 | 4/2018 |

* cited by examiner

CENTRIFUGAL BLOWER

CROSS REFERENCE TO RELATED APPLICATION

The present application is a continuation application of International Patent Application No. PCT/JP2019/039149 filed on Oct. 3, 2019, which designated the U.S. and claims the benefit of priority from Japanese Patent Application No. 2018-216354 filed on Nov. 19, 2018. The entire disclosures of all of the above applications are incorporated herein by reference.

TECHNICAL FIELD

The present disclosure relates to a single inlet centrifugal blower.

BACKGROUND

There is a single inlet centrifugal blower capable of separately drawing an inside air and an outside air at the same time.

SUMMARY

A single inlet centrifugal blower is applied to an inside-outside air double laminar flow type air conditioner and configured to separately draw the inside air and the outside air at the same time. The centrifugal blower includes a box, a filter, an impeller, a scroll casing, an annular bell mouth, a partition wall, and a separation tube. The box defines an outside air introducing port through which the outside air is introduced into the box and an inside air introducing port through which the inside air is introduced into the box. The filter is configured to collect foreign matters in the air introduced into the box. The impeller is configured to rotate by a motor. The impeller is configured to draw the air having passed through the filter in an axial direction of the impeller and blow the air radially outward of the impeller. The scroll casing surrounds the impeller, has a nose portion on an outer circumference of the scroll casing, and defines an air passage between the scroll casing and the impeller that has an area gradually increases from the nose portion in a circumferential direction. The annular bell mouth is disposed in a first end surface of the scroll casing in the axial direction and defines an inlet through which the air is drawn toward the impeller. The partition wall is configured to divide the air passage into an upper passage and a lower passage. The upper passage and the lower passage are arranged from a first side end of the air passage to a second end side of the air passage along the axial direction. The separation tube includes an air introducing plate that is disposed in an area between the impeller and the filter to partially cover the impeller and defines an air inlet portion and a tubular portion that extends from the air inlet portion through the impeller and then expands radially outside of the impeller. The centrifugal blower is configured such that a portion of the air flows through the filter into the air inlet portion, flows through the tubular portion, and is discharged into the lower passage by the impeller and a portion of the air flows through the filter, flows through an area that is outside of the air introducing plate, flows through outside of the tubular portion, and is discharged into the upper passage by the impeller. A virtual plane is defined as a plane that is parallel to a rotational axis of the impeller and an outer edge of the air introducing plate is on the virtual plane. A passage through which air flows from the filter to the upper passage has a cross-section on the virtual plane that is divided by the separation tube into a first passage cross-section and a second passage cross-section. The first passage cross-section is closer to the nose portion than the second passage cross-section is to the nose portion. The first passage cross-section is larger than the second passage cross-section.

DESCRIPTION OF EMBODIMENT

Figure 1:
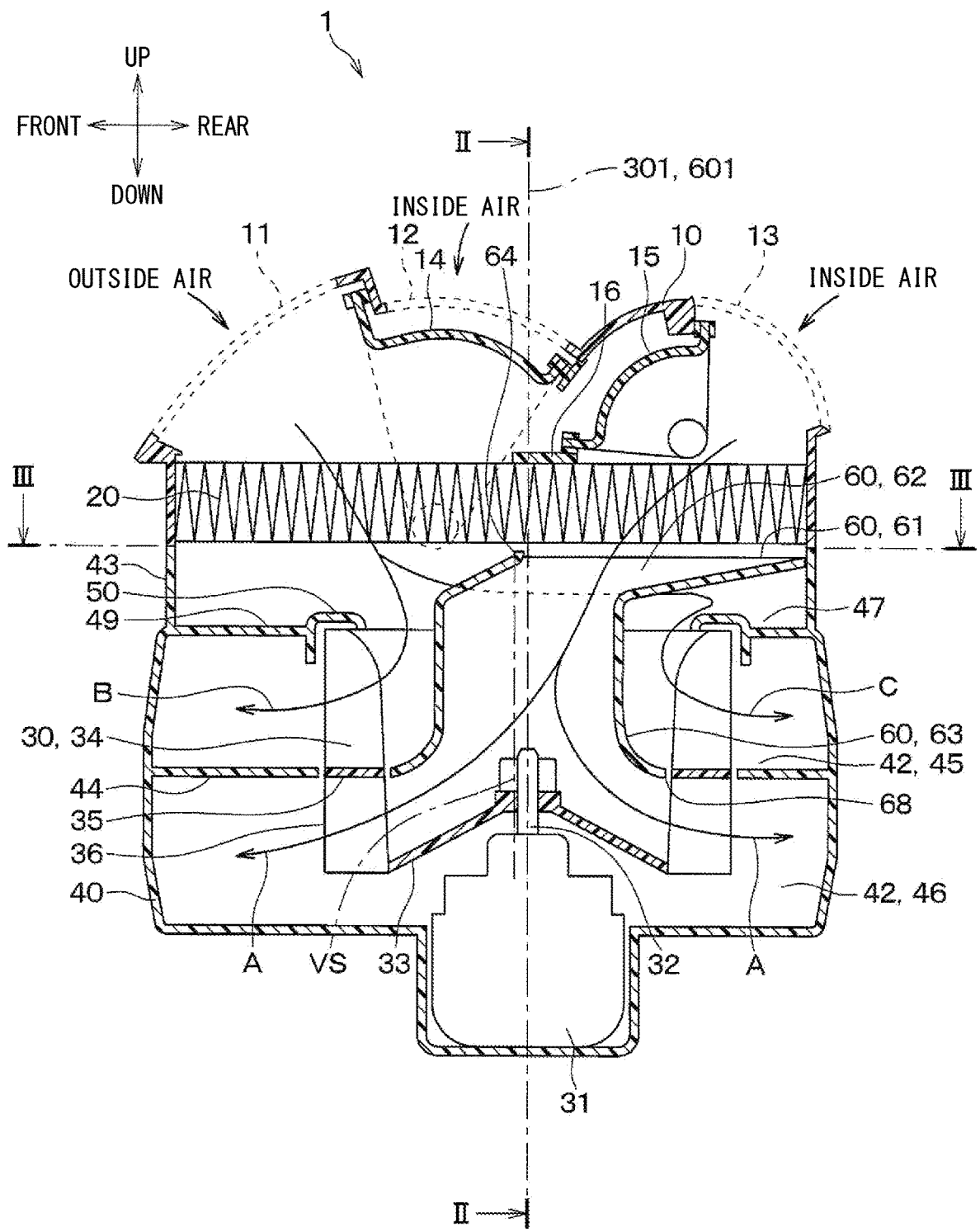
FIG. 1 is a cross-sectional view of a centrifugal blower of a first embodiment.
Figure 2:
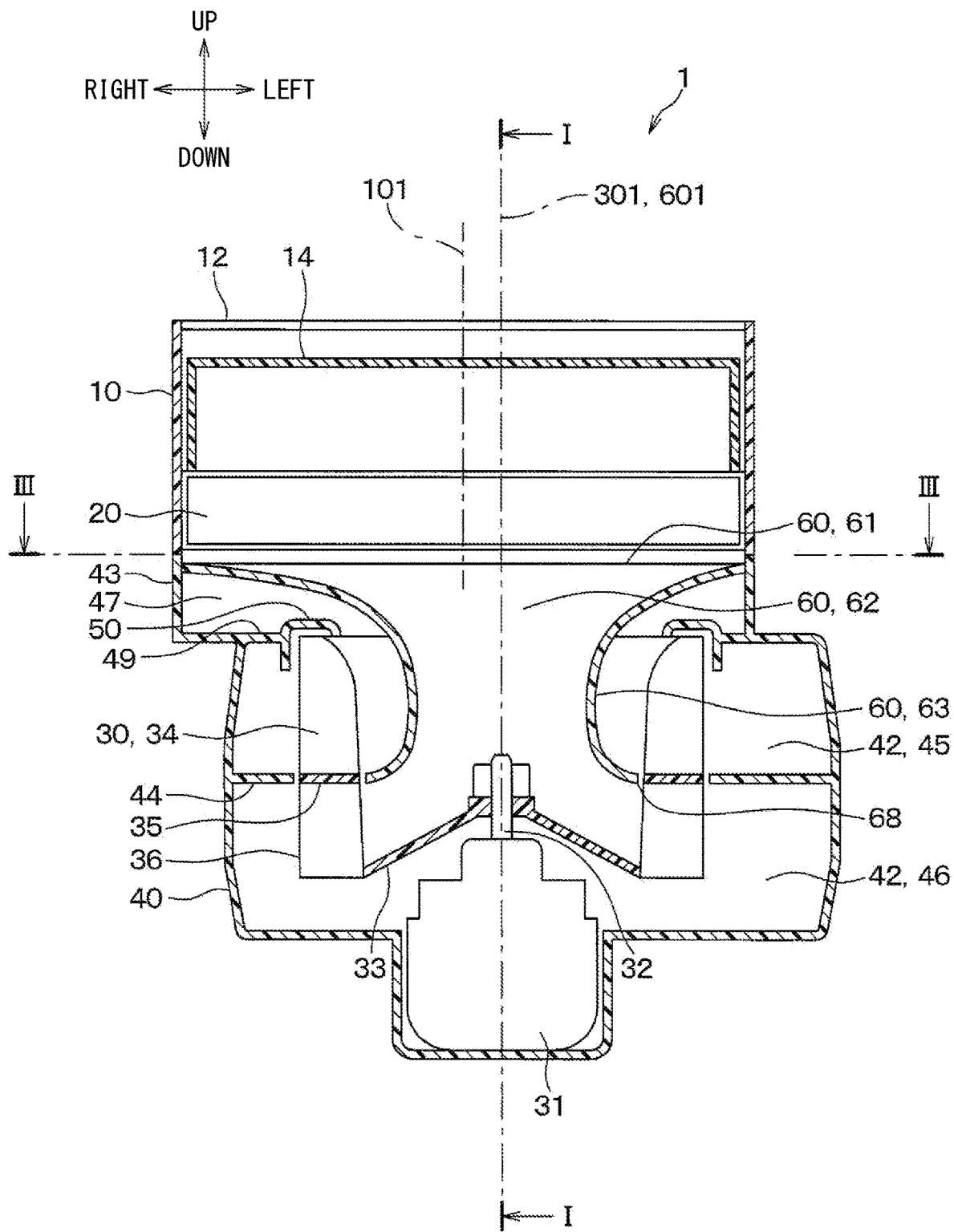
FIG. 2 is a cross-sectional view taken along a line II-II in FIG. 1.

To begin with, examples of relevant techniques will be described.

There is a single inlet centrifugal blower capable of separately drawing an inside air and an outside air at the same time.

The centrifugal blower is configured to draw an air that is introduced into a housing (hereinafter referred to a box) into an impeller through a filter and discharge the air to a ventilation passage defined radially outside of the impeller. The ventilation passage is divided into an upper passage and a lower passage by a partition wall. The upper passage and the lower passage are arranged from a first side to a second side in an axial direction of the impeller. There is a separation tube radially inside of the impeller. The separation tube is provided for separately blowing the air taken from the box into the upper passage and the lower passage. The separation tube includes an air introducing plate and a tubular portion. The air introducing plate is disposed in an area between the impeller and the filter and defines an air inlet portion. The tubular portion extends from the air inlet portion through the impeller and then extends radially outside of the impeller. Because of this configuration, a portion of the air taken from the box flows through a predetermined area of the filter, flows into the tubular portion through the air inlet portion, and is discharged into the lower passage by the impeller. On the other hand, a portion of the air taken from the box flows through the other area of the filter, flows through the outside of the tubular portion without passing through the air introducing plate, and is discharged into the upper passage by the impeller. As a result, the centrifugal blower is configured so that the air taken from the box passes through the entire area of the filter.

By the way, in general, in a centrifugal blower, an air passage defined radially outside of an impeller is configured such that a distance between a trailing edge of a blade of the impeller and an inner wall of a scroll casing is the smallest near a nose portion and increases from the nose portion in a circumferential direction. Therefore, a pressure loss of the air discharged into the air passage by the impeller is large near the nose portion and decreases from the nose portion in the circumferential direction. Thus, the amount of air drawn by the impeller is small near the nose portion and gradually increases from the nose portion in the circumferential direction.

There is an airflow that flows into a passage around the tubular portion of the separation tube (i.e., a passage defined between the air introducing plate and a bell mouth from a right opening and a left opening defined outside of the tubular portion. However, this airflow has not been considered so far and the area of the right opening is the same as that of the left opening. In this case, the amount of air drawn into the impeller through either one of the right opening and the left opening that is farther from the nose portion increases and the amount of air drawn into the impeller through the other of the right opening and the left opening that is closer to the nose portion decreases. As a result, the air volume passing through an area of the filter directly above the left opening and the air volume passing through an area of the filter directly above the right opening vary, so that a pressure loss of the filter as a whole may increase.

It is objective of the present disclosure to provide a centrifugal blower capable of reducing a pressure loss of a filter.

According to one aspect of the present disclosure, a single inlet centrifugal blower is applied to an inside-outside air double laminar flow type air conditioner and configured to separately draw the inside air and the outside air at the same time. The centrifugal blower includes a box, a filter, an impeller, a scroll casing, an annular bell mouth, a partition wall, and a separation tube. The box defines an outside air introducing port through which the outside air is introduced into the box and an inside air introducing port through which the inside air is introduced into the box. The filter is configured to collect foreign matters in the air introduced into the box. The impeller is configured to rotate by a motor. The impeller is configured to draw the air having passed through the filter in an axial direction of the impeller and blow the air radially outward of the impeller. The scroll casing surrounds the impeller, has a nose portion on an outer circumference of the scroll casing, and defines an air passage between the scroll casing and the impeller that has an area gradually increases from the nose portion in a circumferential direction. The annular bell mouth is disposed in a first end surface of the scroll casing in the axial direction and defines an inlet through which the air is drawn toward the impeller. The partition wall is configured to divide the air passage into an upper passage and a lower passage. The upper passage and the lower passage are arranged from a first side end of the air passage to a second end side of the air passage along the axial direction. The separation tube includes an air introducing plate that is disposed in an area between the impeller and the filter to partially cover the impeller and defines an air inlet portion and a tubular portion that extends from the air inlet portion through the impeller and then expands radially outside of the impeller. The centrifugal blower is configured such that a portion of the air flows through the filter into the air inlet portion, flows through the tubular portion, and is discharged into the lower passage by the impeller and a portion of the air flows through the filter, flows through an area that is outside of the air introducing plate, flows through outside of the tubular portion, and is discharged into the upper passage by the impeller. A virtual plane is defined as a plane that is parallel to a rotational axis of the impeller and an outer edge of the air introducing plate is on the virtual plane. A passage through which air flows from the filter to the upper passage has a cross-section on the virtual plane that is divided by the separation tube into a first passage cross-section and a second passage cross-section. The first passage cross-section is closer to the nose portion than the second passage cross-section is to the nose portion. The first passage cross-section is larger than the second passage cross-section.

According to this, the amount of air drawn into the impeller through the first passage cross-section and a passage around the separation tube can be increased and the amount of air drawn into the impeller through the second passage cross-section and the passage around the separation tube can be decreased. Thus, the amount of air drawn through the first passage cross-section can be close to the amount of air drawn through the second passage cross-section, so that the amount of air drawn through an area of the filter above the first passage cross-section can be close to the amount of air drawn through an area of the filter above the second passage cross-section. Therefore, since the air volume passing through each area of the filter becomes uniform, the pressure loss of the filter as a whole can be reduced. As a result, an efficiency of the blower can be improved. The passage around the separation tube corresponds to a passage defined by a first end surface of the scroll casing in an axial direction of the impeller, the bell mouth, and the air introducing plate. The efficiency of the blower is an amount of air blown by the centrifugal blower per an electric power supplied to the motor configured to rotate the impeller.

Embodiments of the present disclosure will now be described with reference to the drawings. Parts that are identical or equivalent to each other in the following embodiments are assigned the same reference numerals and will not be described.

First Embodiment

A first embodiment will be described with reference to the drawings. A centrifugal blower 1 of the present embodiment is applied to a vehicle air conditioner that is an inside-outside air double laminar flow type. The centrifugal blower 1 is capable of separately drawing an inside air in a vehicle cabin and an outside air outside of the vehicle cabin at the same time and blowing the inside air and the outside air.

As shown in FIGS. 1 to 4, the centrifugal blower 1 includes a box 10, a filter 20, an impeller 30, a scroll casing 40, a bell mouth 50, a partition wall 44, a separation tube 60, and the like.

The box 10 is disposed in an upper portion of the centrifugal blower 1. The box 10 defines an outside air introducing port 11, a first inside air introducing port 12, and a second inside air introducing port 13 in this order from a front side of the vehicle. The outside air is introduced through the outside air introducing port 11. The inside air is introduced through the first inside air introducing port 12 and the second inside air introducing port 13. The box 10 includes therein a first switching door 14 and a second switching door 15. The first switching door 14 can selectively open and close the outside air introducing port 11 and the first inside air introducing port 12. The second switching door 15 can selectively open and close the second inside air introducing port 13. Each of the first switching door 14 and the second switching door 15 is configured with, for example, a rotary door.

The filter 20 is disposed below the box 10. The filter 20 is configured to collect foreign matters in the air (i.e., the outside air and the inside air) introduced into the box 10. The filter 20 is configured, for example, by bending a dust removing filter medium having a predetermined air permeability into a pleated shape. The filter 20 is disposed so that the pleats are stacked in a direction in which the outside air introducing port 11, the first inside air introducing port 12, and the second inside air introducing port 13 are arranged (e.g., a front-rear direction of the vehicle). In other words, the filter 20 is disposed so that the pleats extend in a direction perpendicular to the direction in which the outside air introducing port 11, the first inside air introducing port 12, and the second inside air introducing port 13 are arranged (e.g., a vehicle width direction). Each of the box 10 and the filter 20 has a substantially rectangular shape when viewed from an upper side of the box 10 and the filter 20.

The impeller 30 is a centrifugal fan that is rotated by a motor 31. The impeller 30 has a main plate 33 fixed to a shaft 32 of the motor 31 and multiple blades 34 fixed to the main plate 33. The impeller 30 is configured to draw the air having passed through the filter 20 in an axial direction and discharge the air radially outward. Blade partition walls 35 are provided to divide area between adjacent ones of the multiple blades 34 into an upper area and a lower area in the axial direction.

The scroll casing 40 surrounds an outside of the impeller 30 in the radial direction. The scroll casing 40 has a nose portion 41 on an outer circumference of the scroll casing 40. The scroll casing 40 defines an air passage 42 that has an area gradually increasing from the nose portion 41 in a circumferential direction. The air passage 42 is mainly defined between an inner wall of the scroll casing 40 and the trailing edges 36 of the blades 34 of the impeller 30. The air passage 42 has a portion that has the largest area and the portion is fluidly in communication with an air conditioner casing (not shown) of an air conditioner. Thus, the air blown out of the air passage 42 of the scroll casing 40 is introduced into the air conditioner casing.

The air conditioner casing includes therein an evaporator, a heater core, an air mix door, and the like for adjusting the temperature and humidity of air (not shown). The air whose temperature and humidity are conditioned in the air-conditioner casing is configured to be blown into the vehicle cabin through a face outlet, a foot outlet, a defroster outlet, and the like.

The scroll casing 40 has a first end surface 49 in the axial direction of the impeller 30 (hereinafter, referred to as an upper surface 49 of the scroll casing 40). The first end surface 49 includes an annular bell mouth 50 defining an inlet through which the air drawn into the impeller 30. The air having passed through the filter 20 is drawn into the impeller 30 through the bell mouth 50.

Further, an attachment frame 43 to which the box 10 and the filter 20 is attached is disposed on the upper surface 49 of the scroll casing 40. That is, the box 10 and the filter 20 are mounted on the attachment frame 43.

Further, the scroll casing 40 includes therein a partition wall 44 that partitions off the air passage 42 into one region and the other region that are arranged in the axial direction of the impeller 30. The partition wall 44 is provided at a position corresponding to the blade partition walls 35 provided between the blades 34 of the impeller 30. In the following description, the one region of the air passage 42 above the partition wall 44 is referred to as an upper passage 45 and the other region of the air passage 42 below the partition wall 44 is referred to as a lower passage 46. The upper passage and the lower passage are arranged from a first end side of the air passage to a second end side of the air passage along the axial direction.

The separation tube 60 extends between an area between the filter 20 and the impeller 30 and an area radially inside of the impeller 30. The separation tube 60 includes an air introducing plate 61 and a tubular portion 63. The air introducing plate 61 is disposed in the area between the impeller 30 and the filter 20 and defines an air inlet portion 62. The tubular portion 63 extends from the air inlet portion 62 through the impeller 30 and then expands outward in the radial direction.

Figure 3:
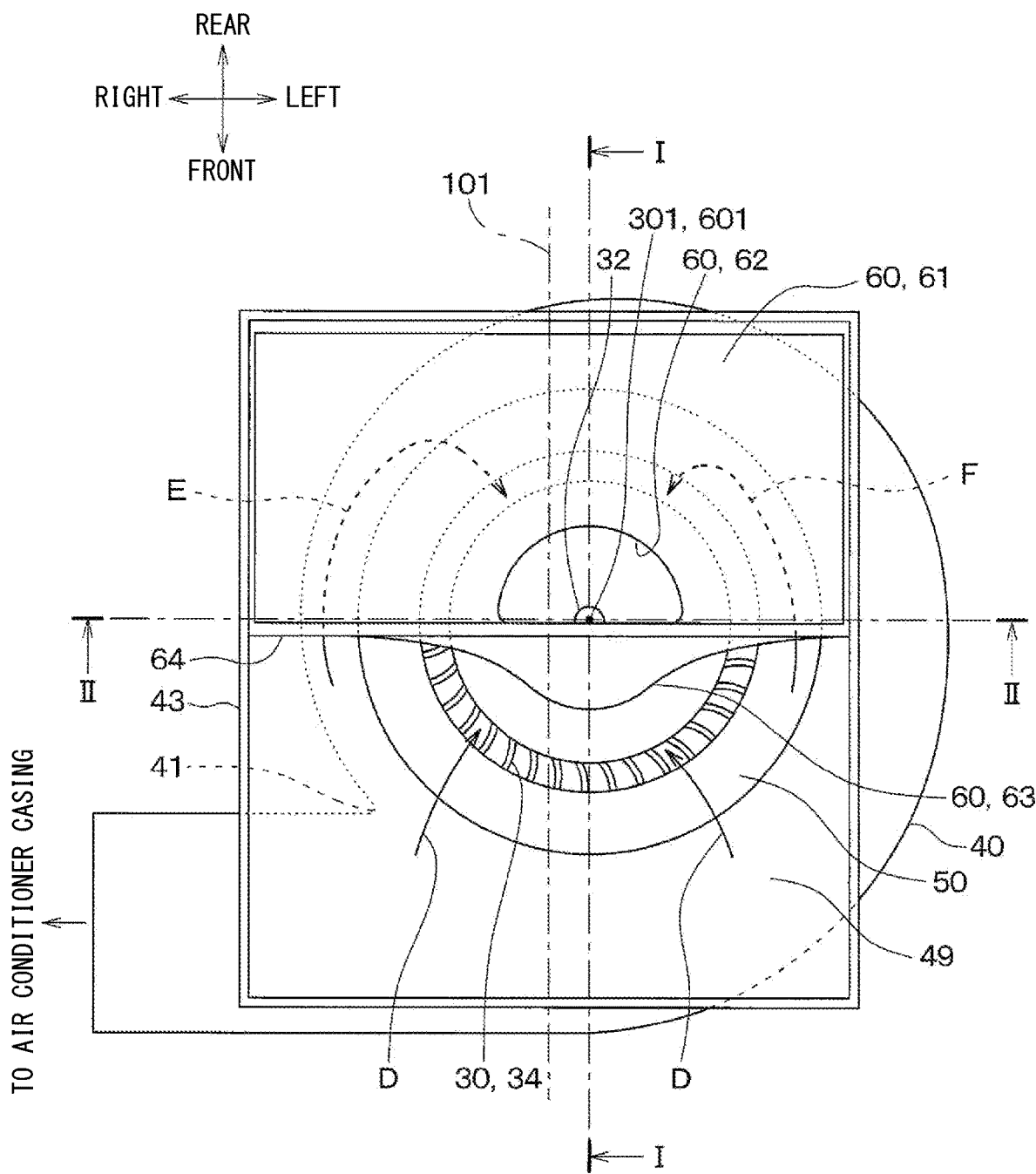
FIG. 3 is a cross-sectional view taken along a line III-Ill of FIGS. 1 and 2.

As shown in FIG. 3, the air introducing plate 61 has a substantially rectangular outer shape when viewed from an upper side of the air introducing plate 61. The air introducing plate 61 covers almost half of an area of the bell mouth 50. Specifically, as shown in FIG. 1, the air introducing plate 61 has an outer edge 64 that is disposed near a rotational shaft 301 of the impeller 30. The outer edge 64 is placed at a position corresponding to an end portion 16 of the second switching door 15 of the box 10 near the filter 20 when the second switching door 15 fully opens the second inside air introducing port 13. The position corresponding to the end portion 16 of the second switching door 15 near the filter 20 can be also referred to as a position directly lower side of the end portion 16 of the second switching door 15.

The air introducing plate 61 and the tubular portion 63 are connected into a funnel shape. The tubular portion 63 has a tubular shape in a region inside the impeller 30 in the radial direction. The tubular portion 63 includes an end portion 68 opposite to the air introducing plate 61 and the end portion 68 is placed at a position corresponding to the blade partition walls 35 disposed between the blades 34 of the impeller 30. The position corresponding to the blade partition walls 35 can also be referred to as a position directly inside of the blade partition walls 35 in the radial direction.

In the above-described configuration, the centrifugal blower 1 can blow air such that a portion of the air introduced into the box 10 flows through a predetermined area of the filter 20, flows through the separation tube 60 from a first side of the separation tube 60 in the axial direction of the impeller 30, and is discharged into the lower passage 46. Further, the centrifugal blower 1 can blow air such that a portion of the air flows through another area of the filter 20, flows around the separation tube 60 from the first side of the separation tube 60 in the axial direction of the impeller 30, and is discharged into the upper passage 45. That is, the centrifugal blower 1 is a single-inlet blower. The predetermined area of the filter 20 is, for example, an area defined on a rear side of a contact position of the filter 20 with the end portion 16 of the second switching door 15. Further, the another area of the filter 20 is, for example, an area defined on a front side of the contact position of the filter 20 with the end portion 16 of the second switching door 15.

In FIG. 1, the first switching door 14 opens the outside air introducing port 11 while closing the first inside air introducing port 12 and the second switching door 15 opens the second inside air introducing port 13. In this state, the centrifugal blower 1 can separately draw the inside air and the outside air at the same time and blow them out.

As shown by arrows A in FIG. 1, the inside air introduced through the second inside air introducing port 13 passes through an area of the filter 20 located substantially directly above the air introducing plate 61, flows through the air inlet portion 62 defined in the air introducing plate 61, flows through the tubular portion 63, and is discharged into the lower passage 46 by the impeller 30.

On the other hand, as shown by arrows B and C in FIG. 1, the outside air introduced through the outside air introducing port 11 passes through an area of the filter 20 other than the area substantially directly above the air introducing plate 61, flows through an area outside of the air introducing plate 61, flows around the tubular portion 63, and is discharged into the upper passage 45 by the impeller 30.

Specifically, as shown by arrow B in FIG. 1 and arrow D in FIG. 3, a part of the air flowing through the area outside of the air introducing plate 61 is directly radially drawn into the impeller 30. Further, as shown by arrows C in FIG. 1 and arrows E and F in FIG. 3, another portion of the air flowing through the area outside of the air introducing plate 61 flows into a passage 47 defined on a far side of the separation tube 60 from a right side area and a left side area defined outside of the tubular portion 63 of the separation tube 60, and is drawn into the impeller 30. The passage 47 defined on the far side of the separation tube 60 is a passage defined in a gap between the upper surface 49 of the scroll casing 40, the bell mouth 50, and the air introducing plate 61.

Figure 5:
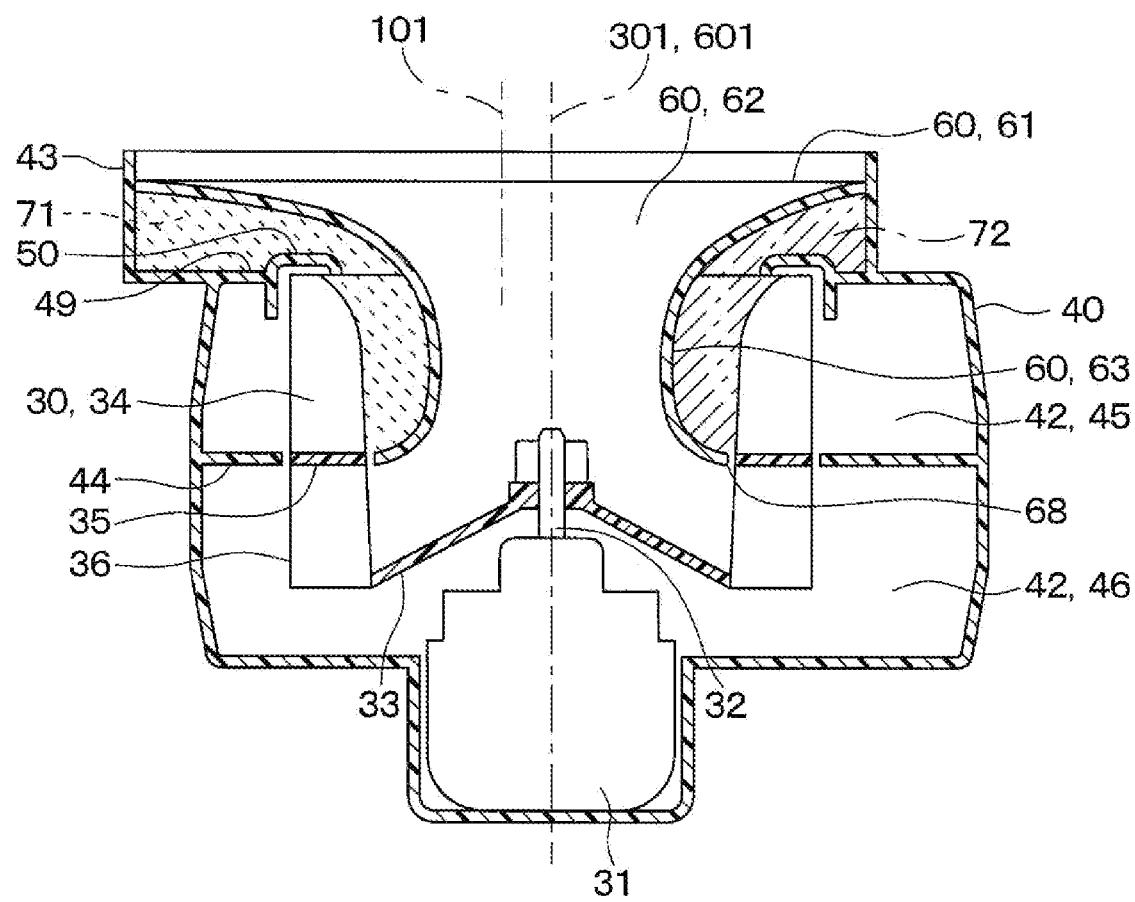
FIG. 5 is an explanatory diagram illustrating a first passage cross-section and a second passage cross-section of the centrifugal blower of the first embodiment.

Here, as shown in FIG. 1, in the present embodiment, a virtual plane VS is defined as a plane that is parallel to the rotational shaft 301 of the impeller 30 and the outer edge 64 of the air introducing plate 61 is on the virtual plane VS. The virtual plane VS passes through a passage through which the air flows between the filter 20 and the upper passage 45. Then, as shown in FIG. 5, in the present embodiment, the passage defined between the filter 20 and the upper passage 45 has a cross-section on the virtual plane VS that is divided by the separation tube 60 into a first passage cross-section 71 and a second passage cross-section 72. The first passage cross-section 71 is closer to the nose portion 41 than the second passage cross-section 72 is to the nose portion. That is, the second passage cross-section is farther from the nose portion 41. In other words, the virtual plane VS is divided into a first virtual plane and a second virtual plane by the rotational axis 301 of the impeller 30. A projection point of the nose portion that is projected onto the virtual plane is on the first virtual plane and the first cross-section 71 is on the first virtual plane and the second cross-section 72 is on the second virtual plane.

In FIG. 5, the first passage cross-section 71 is hatched with a broken line and the second passage cross-section 72 is hatched with a dashed and a dotted line though they are not actual cross-sections but openings, for descriptive purposes. This also applies to FIGS. 7, 9, 12, 14, 16 and 18 referred to in the second to eighth embodiments which will be described later.

Figure 4:
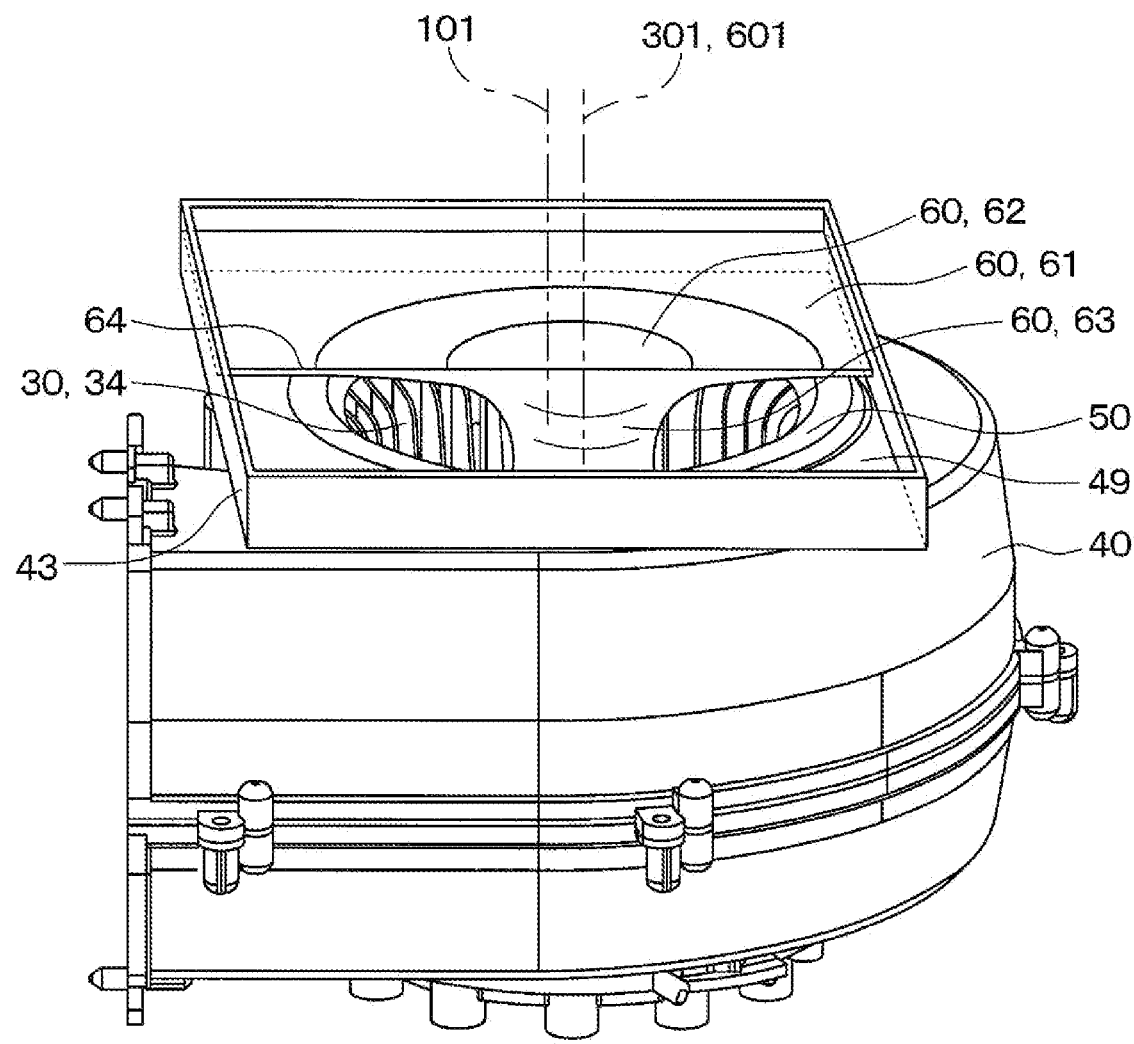
FIG. 4 is a perspective view of the centrifugal blower of the first embodiment without the box.

As shown in FIGS. 4 and 5, in the present embodiment, the box 10 has a center 101 that is offset from both the rotational axis 301 of the impeller 30 and a center axis 601 of the tubular portion 63 of the separation tube 60 toward the first passage cross-section 71 (i.e., toward the nose portion 41). Thus, the first passage cross-section 71 is larger than the second passage cross-section 72. Specifically, in the present embodiment, a portion of the first passage cross-section 71 defined between the impeller 30 and the air introducing plate 61 is larger than a portion of the second passage cross-section 72 defined between the impeller 30 and the air introducing plate 61.

Next, advantages of the centrifugal blower 1 of the present embodiment obtained by configuring the blower 1 such that the first passage cross-section 71 is larger than the second passage cross-section 72.

As described above, the air passage 42 defined outside of the impeller 30 in the radial direction has an area that gradually increases from the nose portion 41 in the circumferential direction. That is, a distance between the trailing edges 36 of the blades 34 of the impeller 30 and the inner wall of the scroll casing 40 is the narrowest near the nose portion 41 and the distance gradually increases from the nose portion 41 in the circumferential direction. Therefore, a pressure loss of the air discharged into the air passage 42 by the impeller 30 is large near the nose portion 41 and gradually decreases from the nose portion 41 in the circumferential direction. Therefore, if the first passage cross-section 71 has the same area as that of the second passage cross-section 72, the amount of air drawn into the impeller through the first passage cross-section 71 decreases and the amount of air drawn into the impeller 30 through the second passage cross-section 72 increases. In this case, the amount of air passing through an area of the filter 20 above the first passage cross-section 71 decreases and the amount of air passing through an area above the second passage cross-section 72 increases. As described above, when the variation in the amount of air passing through each area of the filter 20 becomes large, the pressure loss of the filter 20 as a whole becomes large. As a result, the efficiency of the blower 1 may decrease.

Therefore, in the present embodiment, the center 101 of the box 10 is offset from both the rotational axis 301 of the impeller 30 and the center axis 601 of the tubular portion 63 of the separation tube 60 toward the first passage cross-section 71 (i.e., toward the nose portion 41), so that the first passage cross-section 71 is larger than the second passage cross-section 72. As a result, compared to a case that an area of the first passage cross-section 71 is the same as that of the second passage cross-section 72, the amount of air drawn into the impeller 30 through the first passage cross-section 71 is increased and the amount of air drawn into the impeller 30 through the second passage cross-section 72 is decreased. Therefore, the amount of air drawn into the impeller 30 through the first passage cross-section 71 can be close to the amount of air drawn into the impeller 30 through the second passage cross-section 72, so that the amount of air passing through an area of the filter 20 above the first passage cross-section 71 is close to the amount of air passing through an area of the filter 20 above the second passage cross-section 72. Therefore, air passes uniformly through each area of the filter 20, thereby reducing a pressure loss of the filter 20 as a whole. As a result, the efficiency of the blower can be improved.

Further, in the present embodiment, the center 101 of the box 10 is offset from both the rotational axis 301 of the impeller 30 and the center axis 601 of the tubular portion 63 of the separation tube 60 toward the first passage cross-section 71 (i.e., the nose portion 41). Thus, an area of the first passage cross-section 71 and an area of the second passage cross-section 72 can be adjusted without changing a size of the centrifugal blower 1 in the axial direction of the impeller 30 (e.g., a height dimension of the centrifugal blower 1).

Further, in the present embodiment, the area of the first passage cross-section 71 and the area of the second passage cross-section 72 can be adjusted without significantly changing configurations of the box 10 and the separation tube 60 from those of a blower in which the center 101 of the box 10, the rotational axis 301 of the impeller 30, and the center axis 601 of the separation tube 60 align with each other.

Further, in the present embodiment, since the configurations of the box 10 and the separation tube 60 are not significantly changed, there is little influence to an airflow that flows from the box 10 through the separation tube 60 into the lower passage 46.

Second to Eighth Embodiments

Second to eighth embodiments will be described. The second to eighth embodiments are different from the first embodiment in the configuration of the separation tube 60 or the configuration of the box 10. Other portions are similar to those of the first embodiment and different portions from the first embodiment will be described.

Second Embodiment

Figure 6:
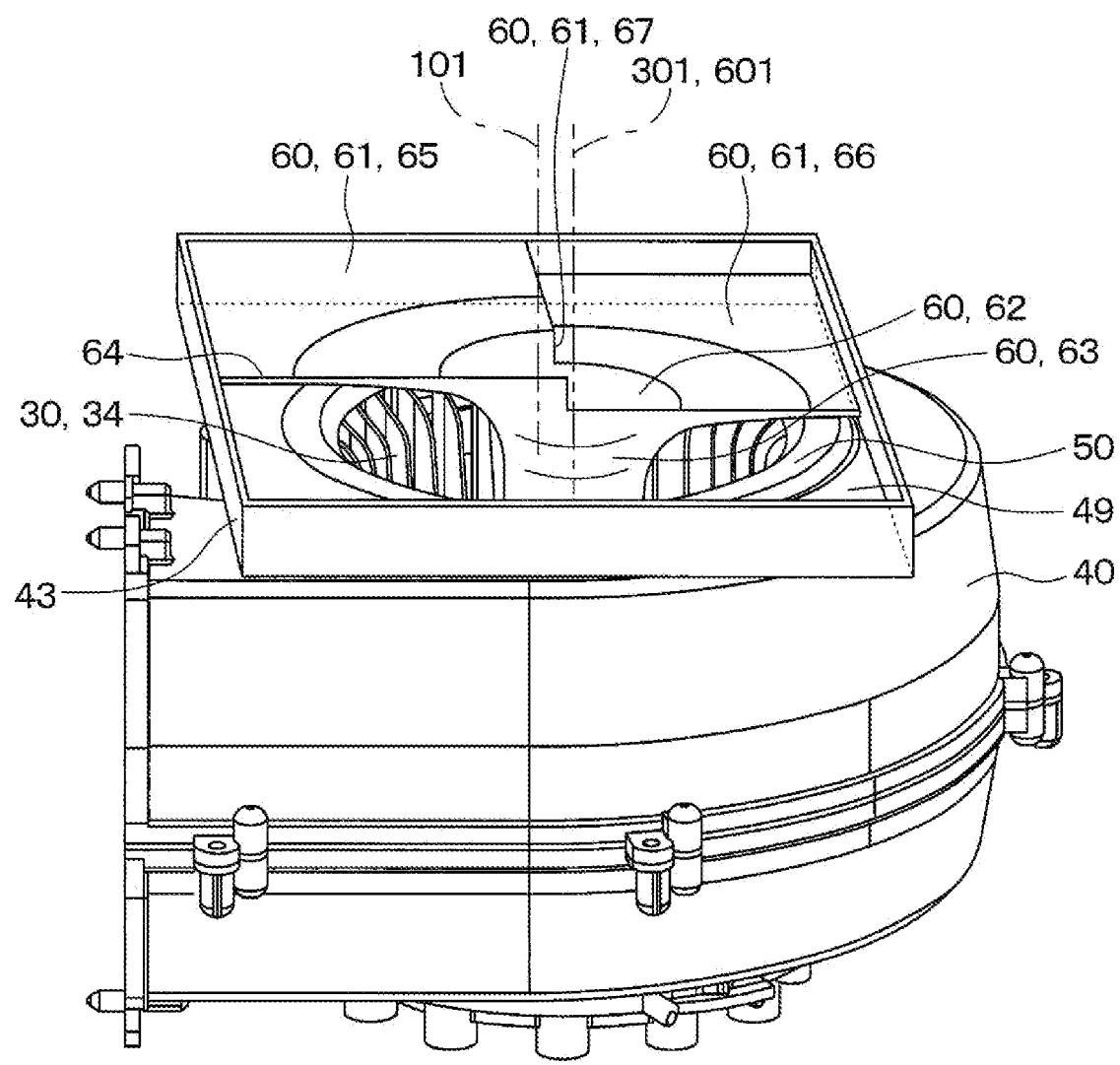
FIG. 6 is a perspective view of the centrifugal blower of a second embodiment without the box.
Figure 7:
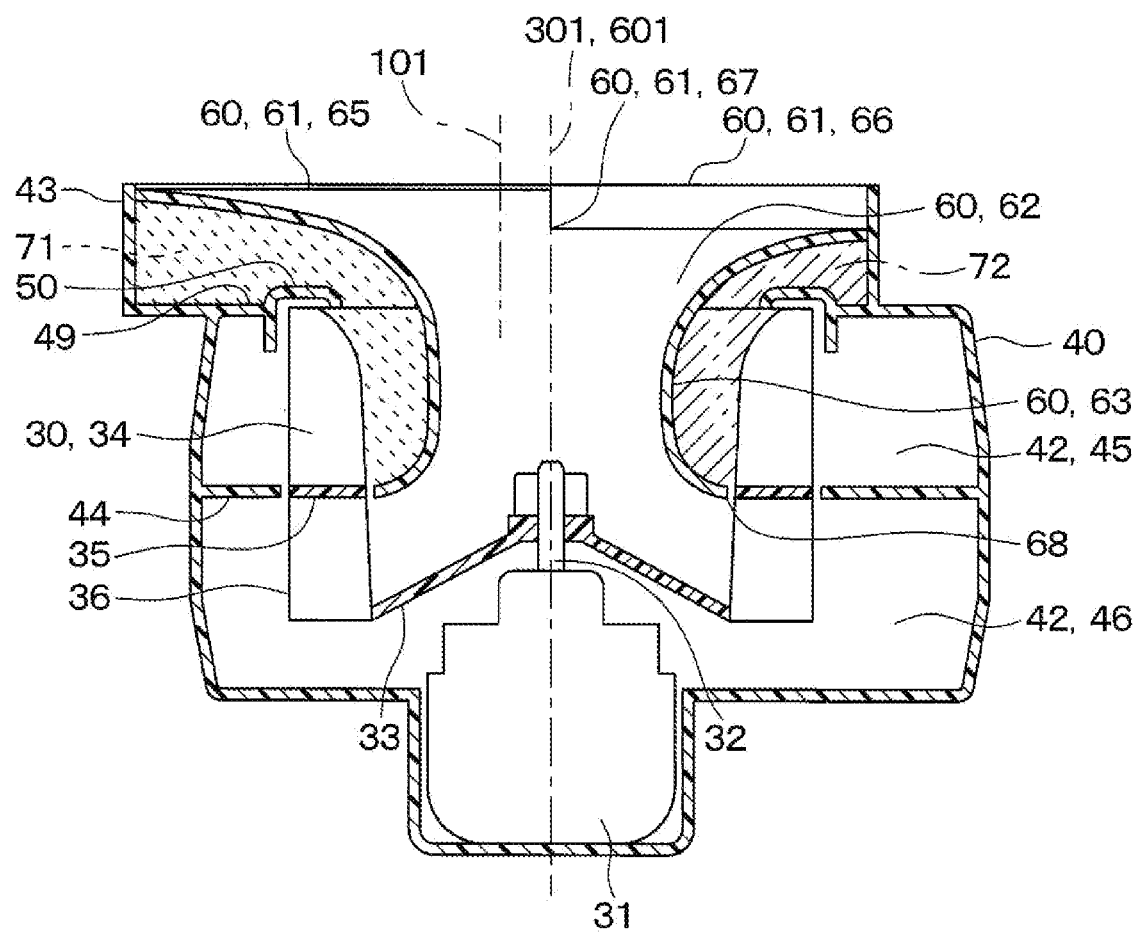
FIG. 7 is an explanatory diagram illustrating a first passage cross-section and a second passage cross-section of the centrifugal blower of the second embodiment.

As shown in FIGS. 6 and 7, in the second embodiment, the air introducing plate 61 of the separation tube 60 has a first portion defining the first passage cross-section 71, a second portion defining the second passage cross-section 72, and a connecting portion 67 connecting between the first portion and the second portion. The second portion 66 is offset from the first portion toward the bell mouth 50. Also in the second embodiment, the center 101 of the box 10 is offset from both the rotational axis 301 of the impeller 30 and the center axis 601 of the tubular portion 63 of the separating tube 60 toward the nose portion 41.

According to the above-described configuration, also in the second embodiment, a portion of the first passage cross-section 71 defined between the impeller 30 and the air introducing plate 61 is larger than a portion of the second passage cross-section 72 defined between the impeller 30 and the air introducing plate 61. Therefore, the area of the first passage cross-section 71 is larger than the area of the second passage cross-section 72. Therefore, the second embodiment can also achieve the same advantages as those of the first embodiment.

Third Embodiment

Figure 8:
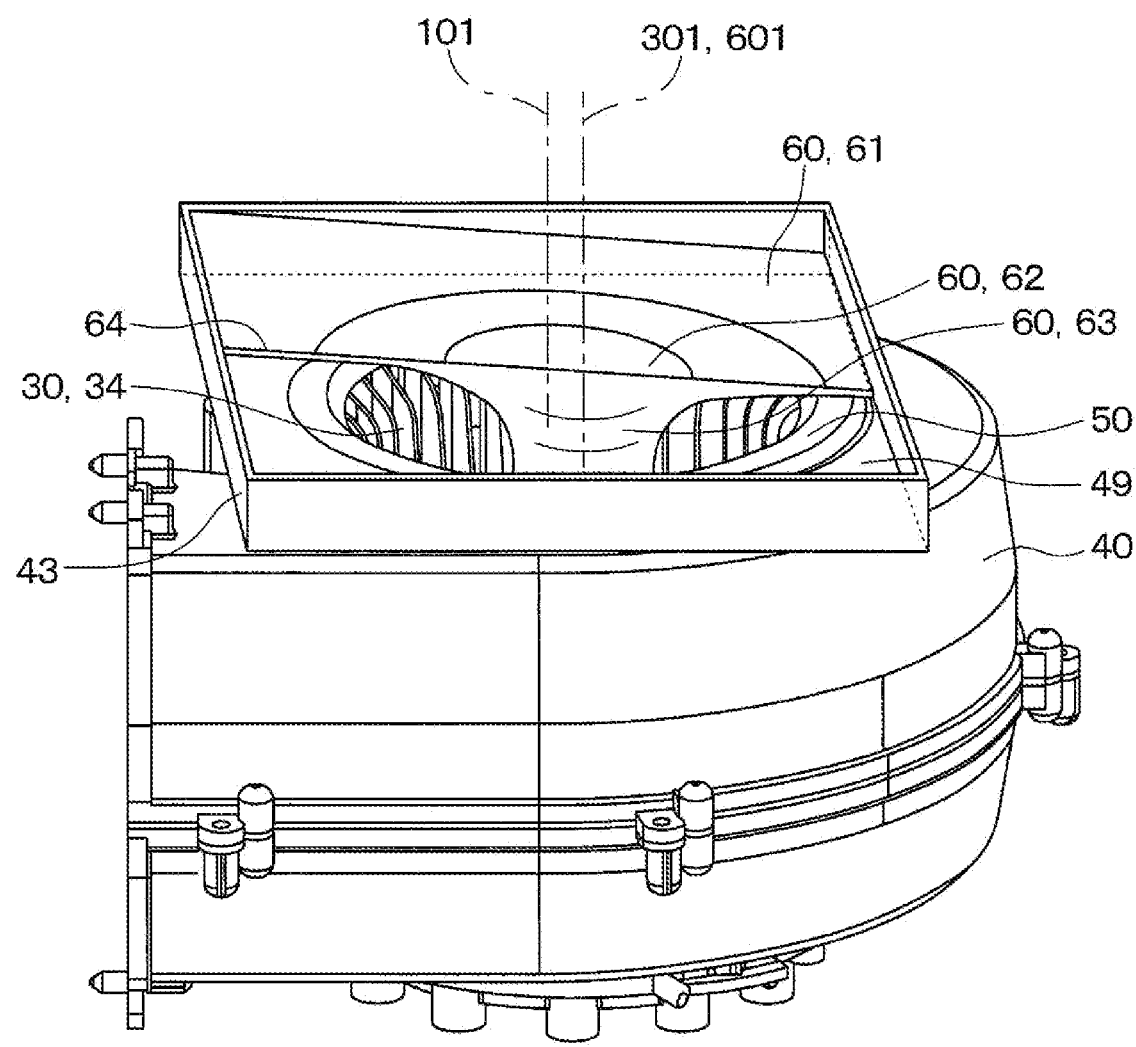
FIG. 8 is a perspective view of a centrifugal blower of a third embodiment without the box.
Figure 9:
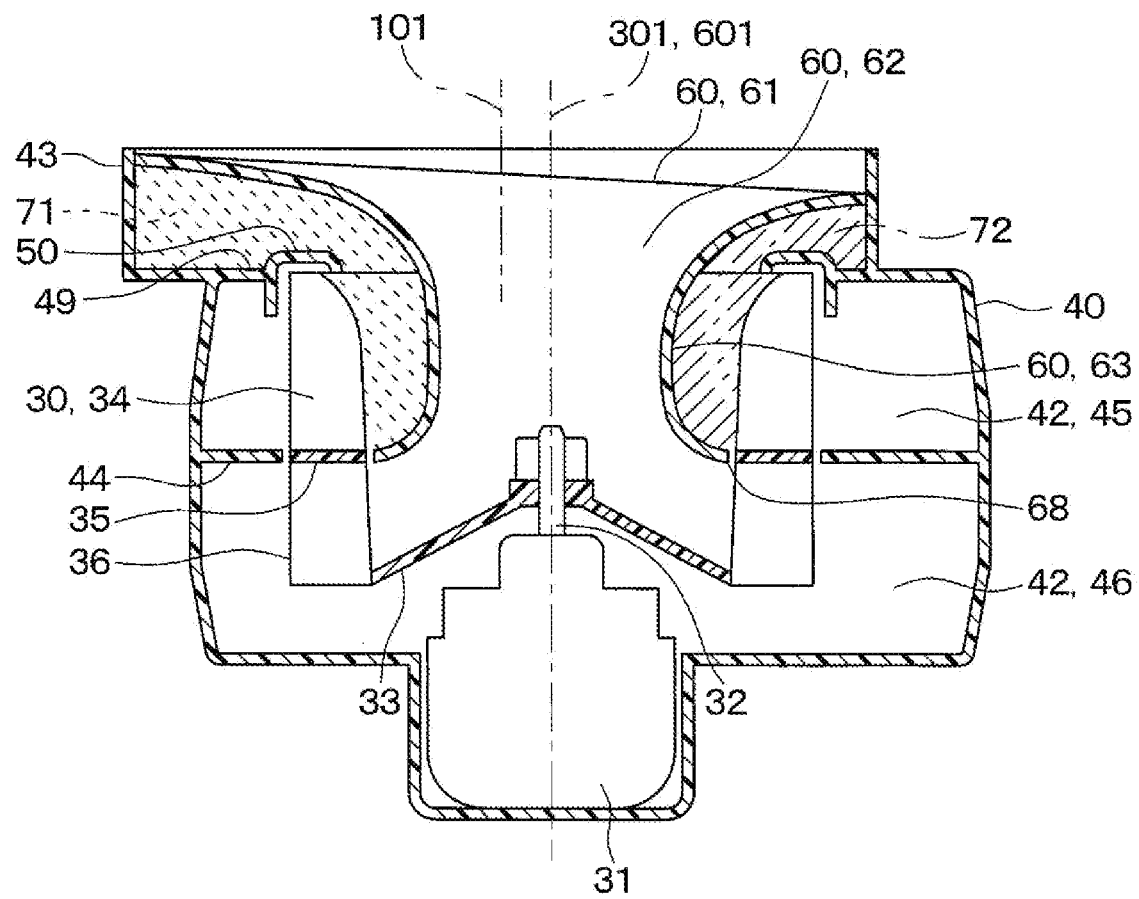
FIG. 9 is an explanatory diagram illustrating a first passage cross-section and a second passage cross-section in the centrifugal blower of the third embodiment.

As shown in FIGS. 8 and 9, in the third embodiment, the air introducing plate 61 of the separation tube 60 has a first portion defining the first passage cross-section 71 and a second portion defining the second passage cross-section 72. The air introducing plate 61 of the third embodiment is tilted toward the bell mouth 50 from the first portion to the second portion. Also in the third embodiment, the center 101 of the box 10 is offset from both the rotational axis 301 of the impeller 30 and the center axis 601 of the tubular portion 63 of the separation tube 60 toward the first passage cross-section 71 (i.e., the nose portion 41).

According to the above-described configuration, also in the third embodiment, a portion of the first passage cross-section 71 defined between the impeller 30 and the air introducing plate 61 is larger than a portion of the second passage cross-section 72 defined between the impeller 30 and the air introducing plate 61. Therefore, the area of the first passage cross-section 71 is larger than the area of the second passage cross-section 72. Therefore, the third embodiment can also achieve the same advantages as those of the first embodiment and the like.

Fourth Embodiment

Figure 10:
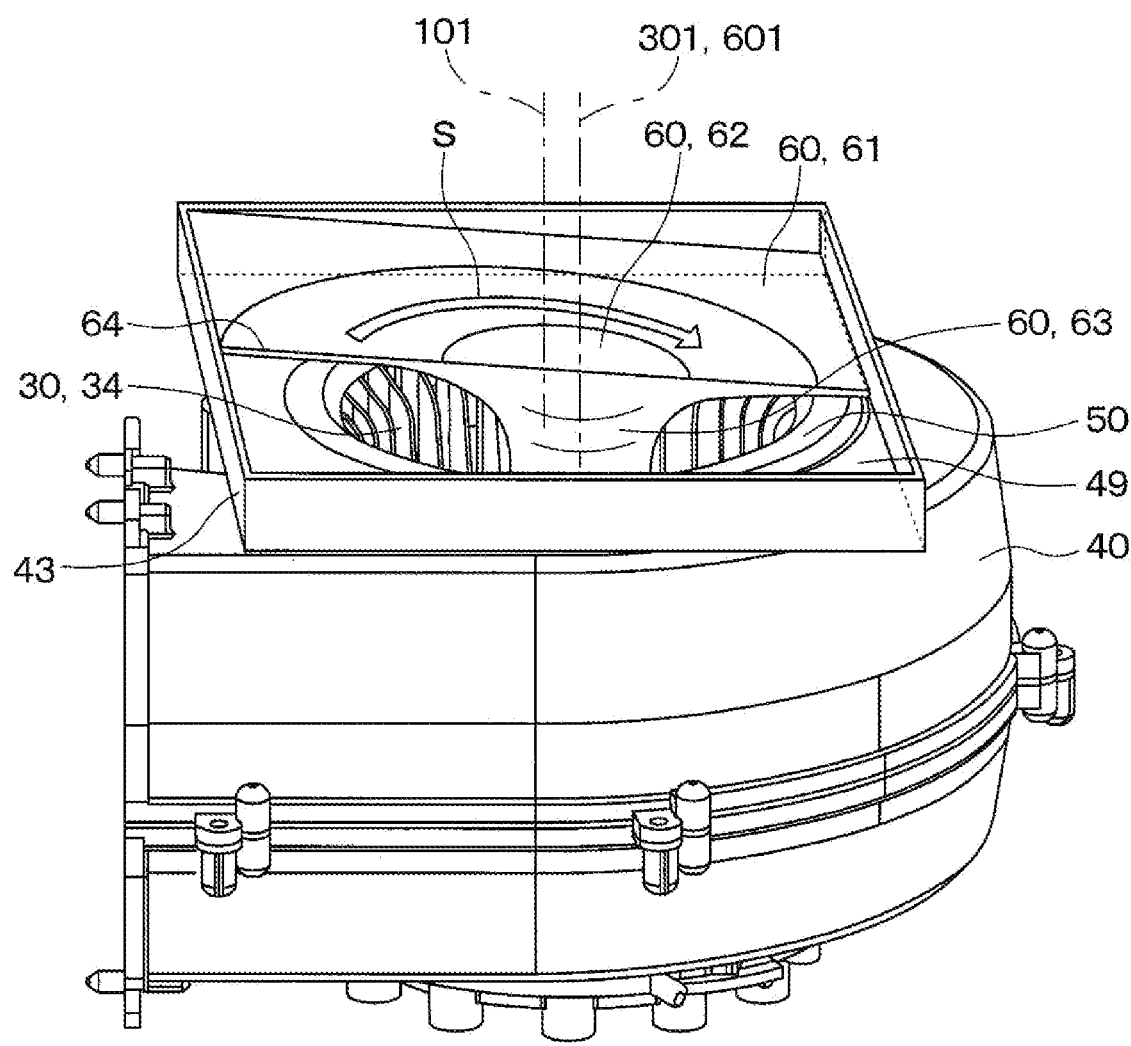
FIG. 10 is a perspective view of a centrifugal blower of a fourth embodiment without the box.

As shown in FIG. 10, also in the fourth embodiment, the air introduction plate 61 of the separation tube 60 has a first portion defining the first passage cross-section and a second portion defining the second passage cross-section 72. The air introducing plate 61 is tilted toward the bell mouth 50 from the first portion to the second portion. Further, in the fourth embodiment, as shown by an arrow S in FIG. 10, a portion of the air introducing plate 61 radially outside of the air inlet portion 62 is sloped in a circumferential direction of the air inlet portion 62 such that a gradient of the portion relative to the bell mouth 50 is constant Also in the fourth embodiment, the center 101 of the box 10 offset from both the rotational axis 301 of the impeller 30 and the center axis 601 of the tubular portion 63 of the separation tube 60 toward the first passage cross-section 71 (i.e., the nose portion 41).

Because of the above-described configuration, also in the fourth embodiment, a portion of the first passage cross-section 71 defined between the impeller 30 and the air introducing plate 61 is larger than a portion of the second passage cross-section 72 defined between the impeller 30 and the air introducing plate 61. Thus, the area of the first passage cross-section 71 is larger than the area of the second passage cross-section 72. Therefore, the fourth embodiment can also achieve the same advantages as those of the first embodiment and the like.

Further, in the fourth embodiment, pressure loss of the air flowing through the passage 47 defined on a far side of the separation tube 60 can be reduced by forming the portion of the air introducing plate 61 radially outside of the air inlet portion 62 into the above described slope shape.

Fifth Embodiment

Figure 11:
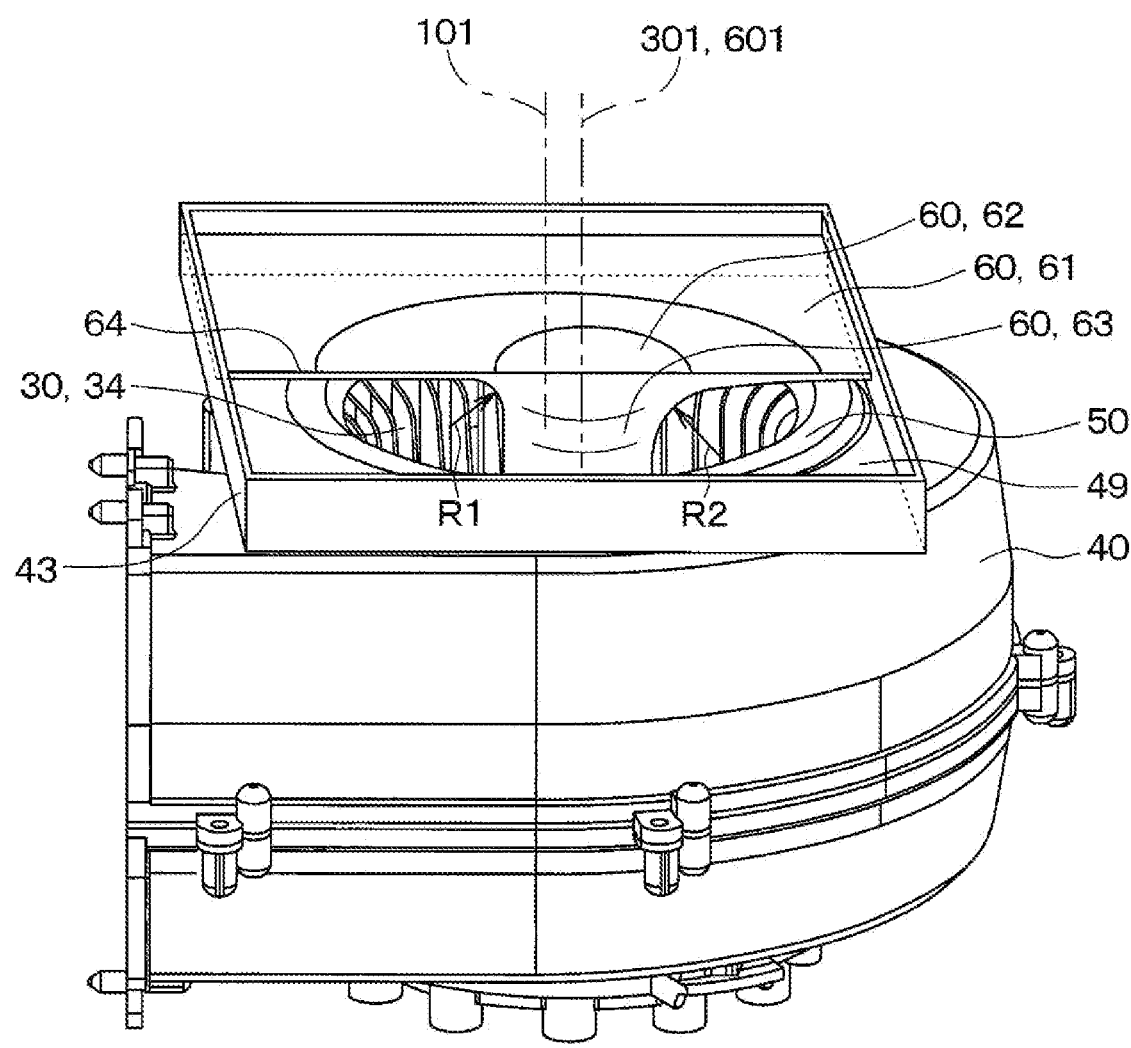
FIG. 11 is a perspective view of a centrifugal blower of a fifth embodiment without the box.
Figure 12:
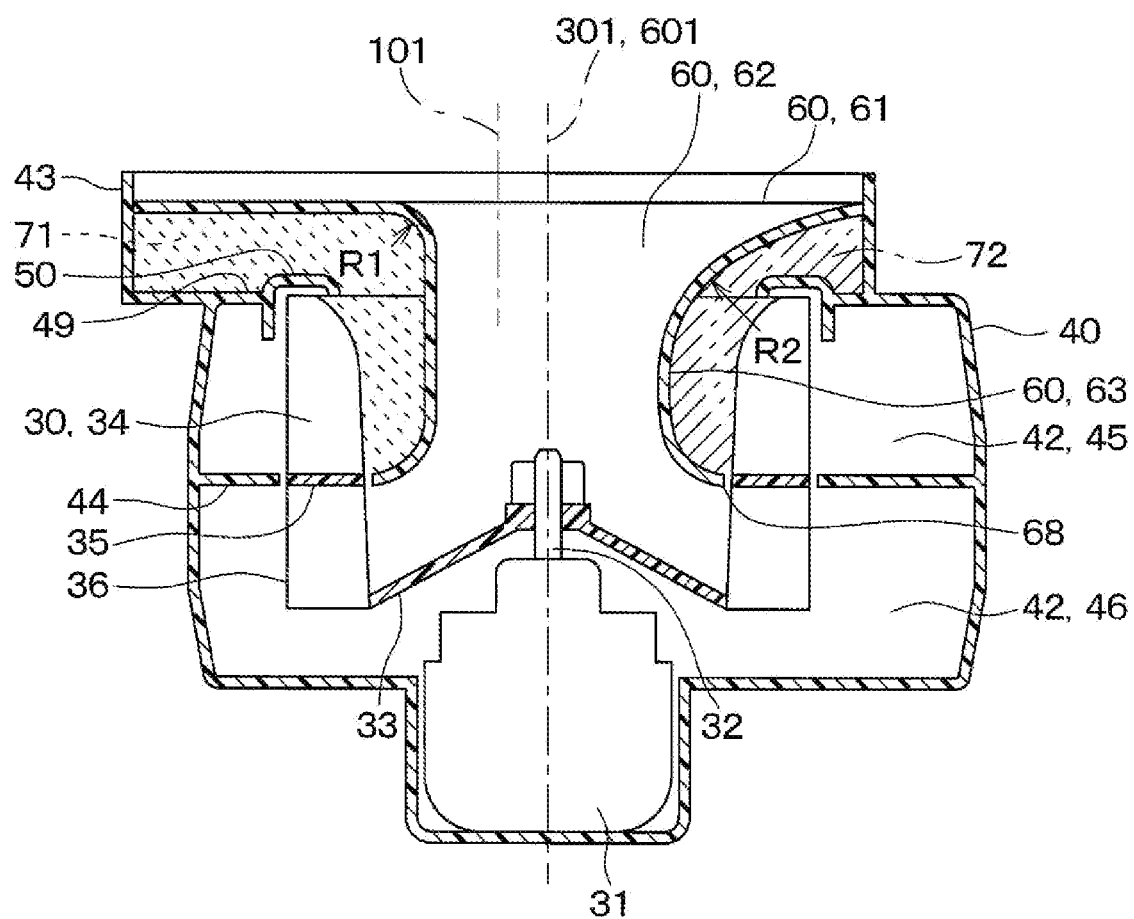
FIG. 12 is an explanatory diagram illustrating a first passage cross-section and a second passage cross-section in the centrifugal blower of the fifth embodiment.

As shown in FIGS. 11 and 12, in the fifth embodiment, the air introducing plate 61 includes a first connecting curved portion that is connected to the tubular portion 63 and defines the first passage cross-section 71 and a second connecting curved portion that is connected to the tubular portion and defines the second passage cross-section 72. The first connecting curved portion has a radius of curvature R1 that is less than a radius of curvature R2 of the second connecting curved portion. Also in the fifth embodiment, the center 101 of the box 10 is offset from both the rotational axis 301 of the impeller 30 and the center axis 601 of the tubular portion 63 of the separation tube 60 toward the first passage cross-section 71 (i.e., toward the nose portion 41).

According to the above-described configuration, also in the fifth embodiment, a portion of the first passage cross-section 71 defined between the impeller 30 and the air introducing plate 61 is larger than a portion of the second passage cross-section 72 defined between the impeller 30 and the air introducing plate 61. Thus, the area of the first passage cross-section 71 is larger than the area of the second passage cross-section 72. Therefore, the fifth embodiment can also achieve the same advantages as those of the first embodiment and the like.

Sixth Embodiment

Figure 13:
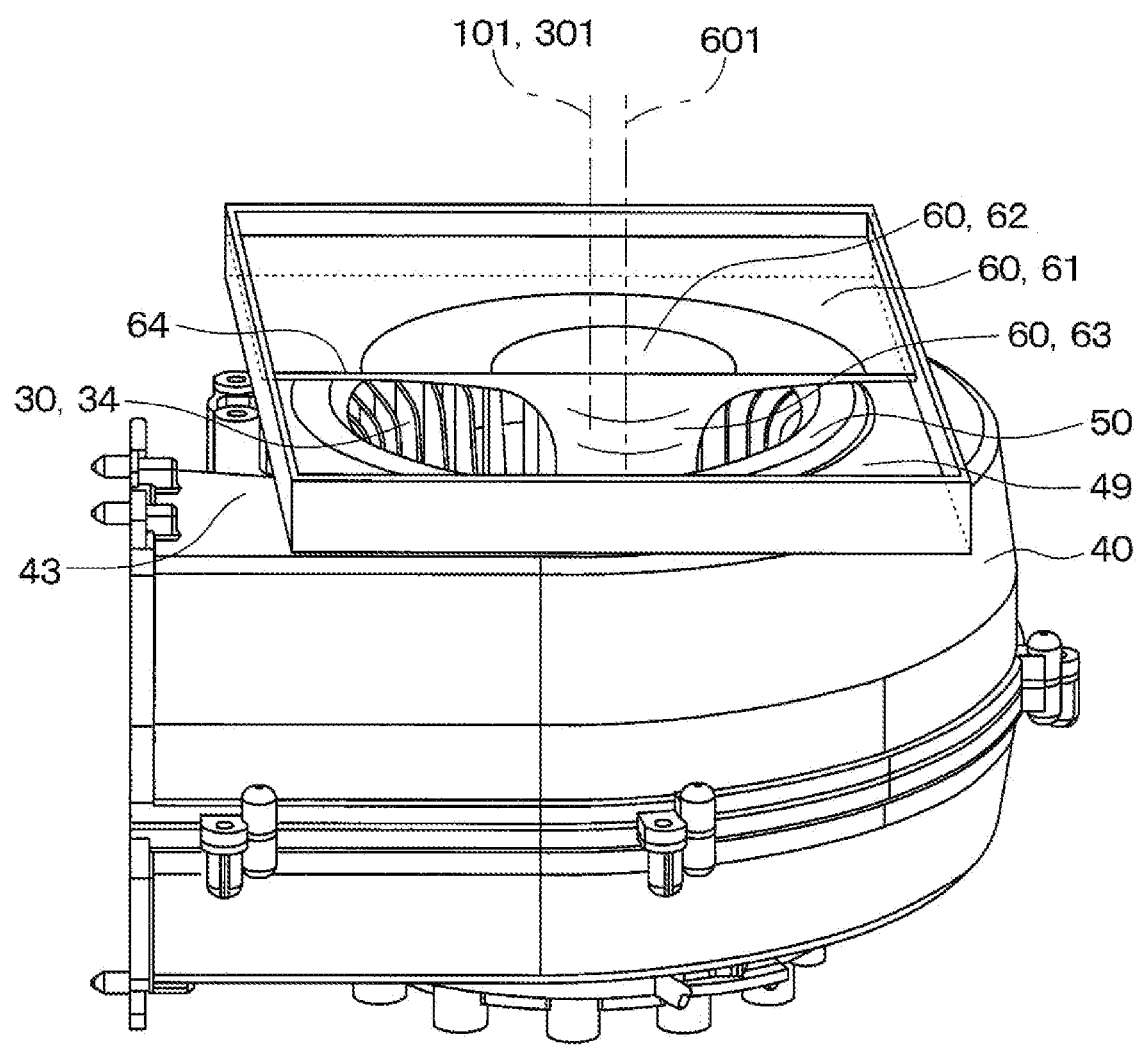
FIG. 13 is a perspective view of a centrifugal blower of a sixth embodiment without the box.
Figure 14:
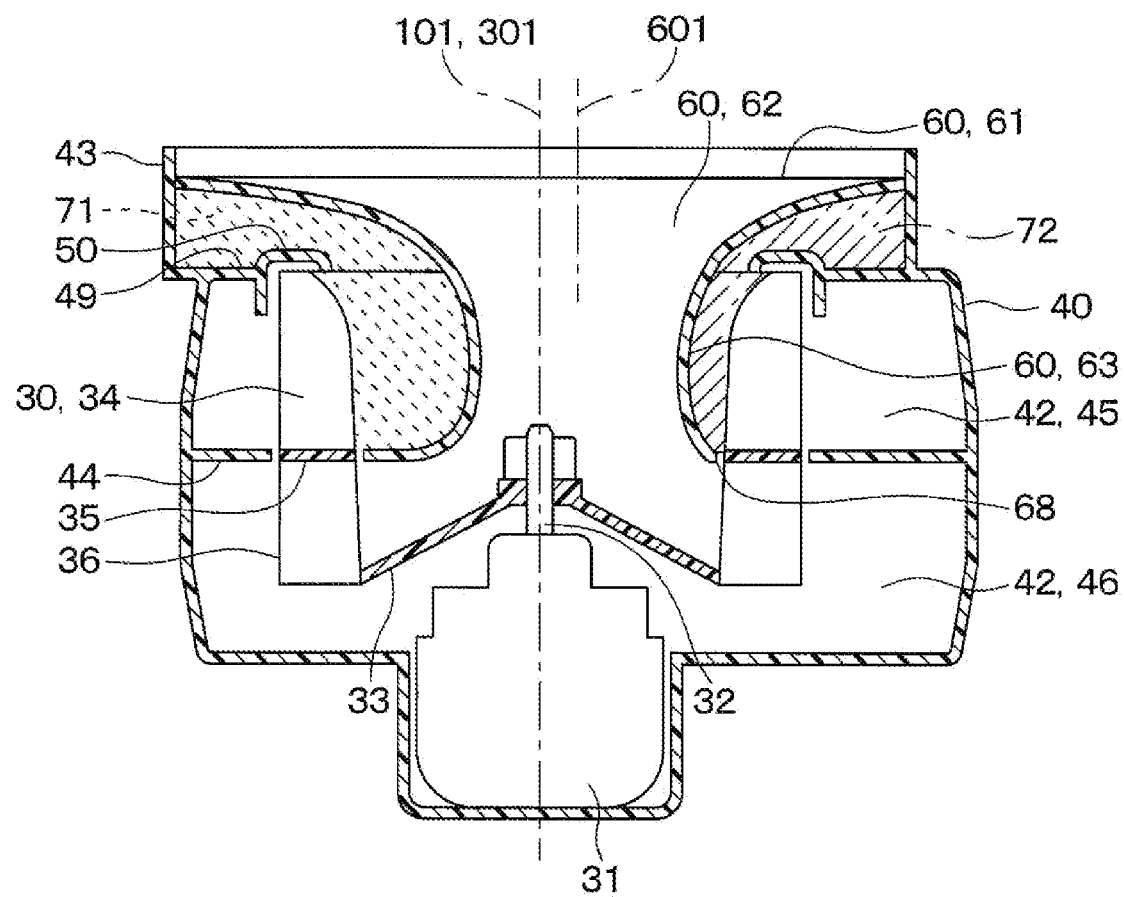
FIG. 14 is an explanatory diagram illustrating a first passage cross-section and a second passage cross-section in the centrifugal blower of the sixth embodiment.

As shown in FIGS. 13 and 14, in the sixth embodiment, the center 101 of the box 10 and the rotational axis 301 of the impeller 30 are substantially aligned with each other. In the sixth embodiment, the center axis 601 of the tubular portion 63 of the separation tube 60 is offset from both the rotational axis 301 of the impeller 30 and the center 101 of the box 10 toward the second passage cross-section 72 (i.e., away from the nose portion 41).

With the above-described configuration, also in the sixth embodiment, the area of the first passage cross-section 71 is larger than the area of the second passage cross-section 72. Specifically, a portion of the first passage cross-section 71 defined between the impeller 30 and the air introducing plate 61 is larger than a portion of the second passage cross-section 72 defined between the impeller 30 and the air introducing plate 61. Further, a portion of the first passage cross-section 71 radially inside of the impeller 30 is larger than a portion of the second passage cross-section 72 radially inside of the impeller 30. Therefore, the sixth embodiment can also achieve the same advantages as those of the first embodiment and the like.

Seventh Embodiment

Figure 15:
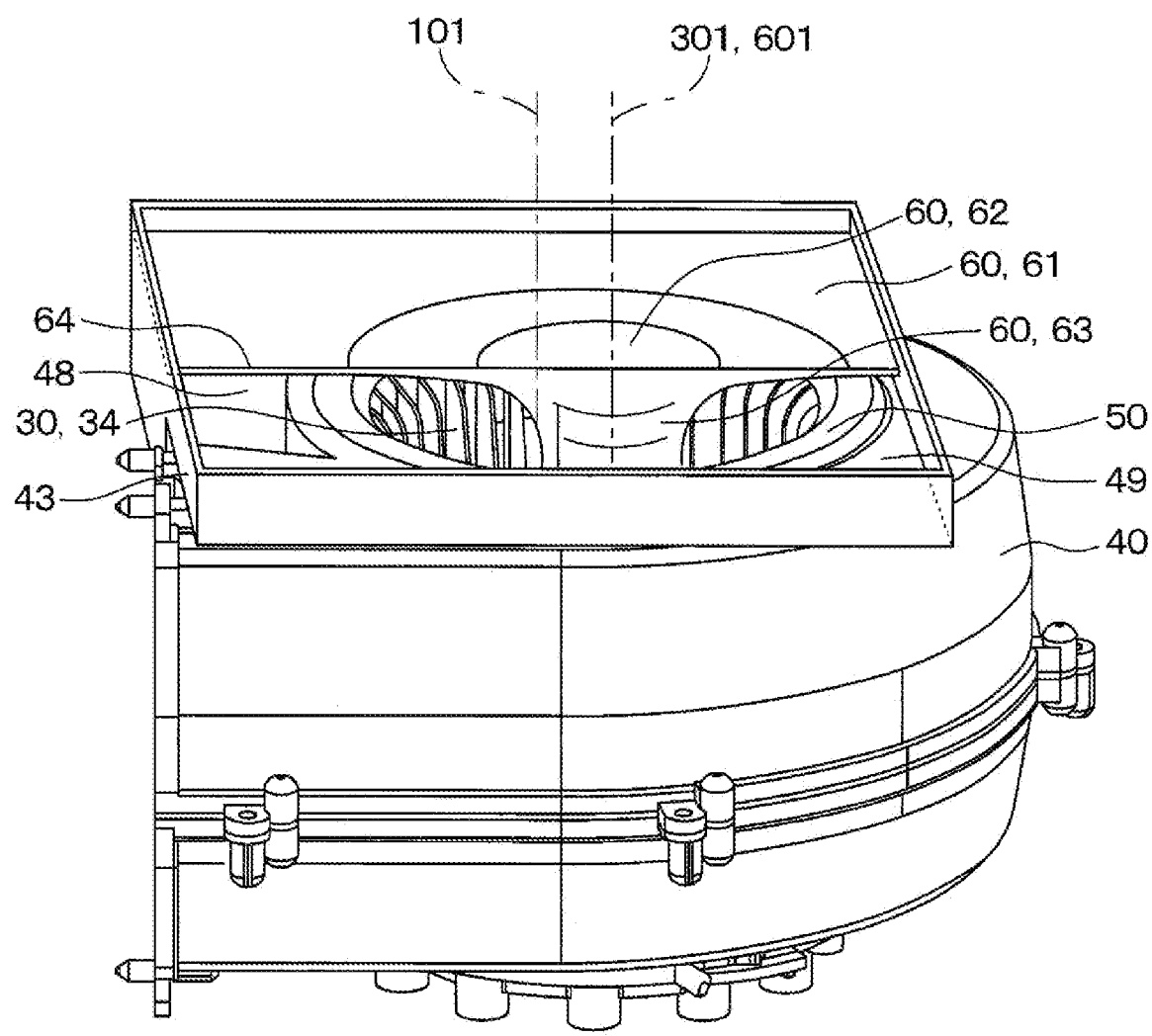
FIG. 15 is a perspective view of a centrifugal blower of a seventh embodiment without the box.
Figure 16:
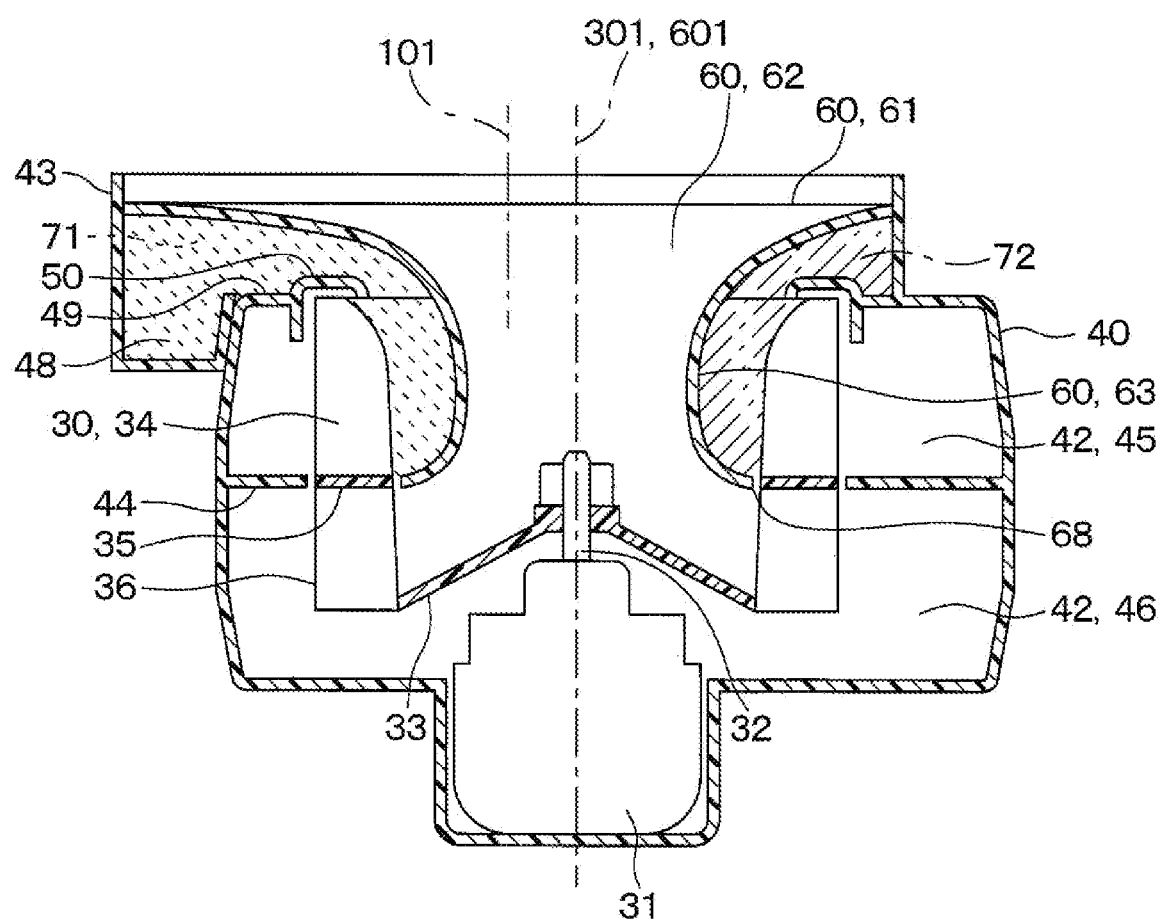
FIG. 16 is an explanatory diagram illustrating a first passage cross-section and a second passage cross-section in the centrifugal blower of the seventh embodiment.

As shown in FIGS. 15 and 16, in the seventh embodiment, a portion of the box 10 and a portion of the air introducing plate 61 extend away from an outer edge of the scroll casing 40 to define a circular arc outside passage 48 in an area radially outside of an outer circumference of the scroll casing 40. The outside passage 48 is defined radially outside of the outer circumference of the scroll casing 40 and includes an area on a side of the upper surface 49 of the scroll casing 40 and the bell mouth 50 opposite to the air introducing plate 61. As a result, in the seventh embodiment, a part of the air having passed through the filter 20 flows through the first passage cross-section 71 into the outside passage 48 and is drawn into the impeller 30.

With the above-described configuration, also in the seventh embodiment, the area of the first passage cross-section 71 is larger than the area of the second passage cross-section 72. Therefore, the seventh embodiment can also achieve the same advantages as those of the first embodiment and the like.

Eighth Embodiment

Figure 17:
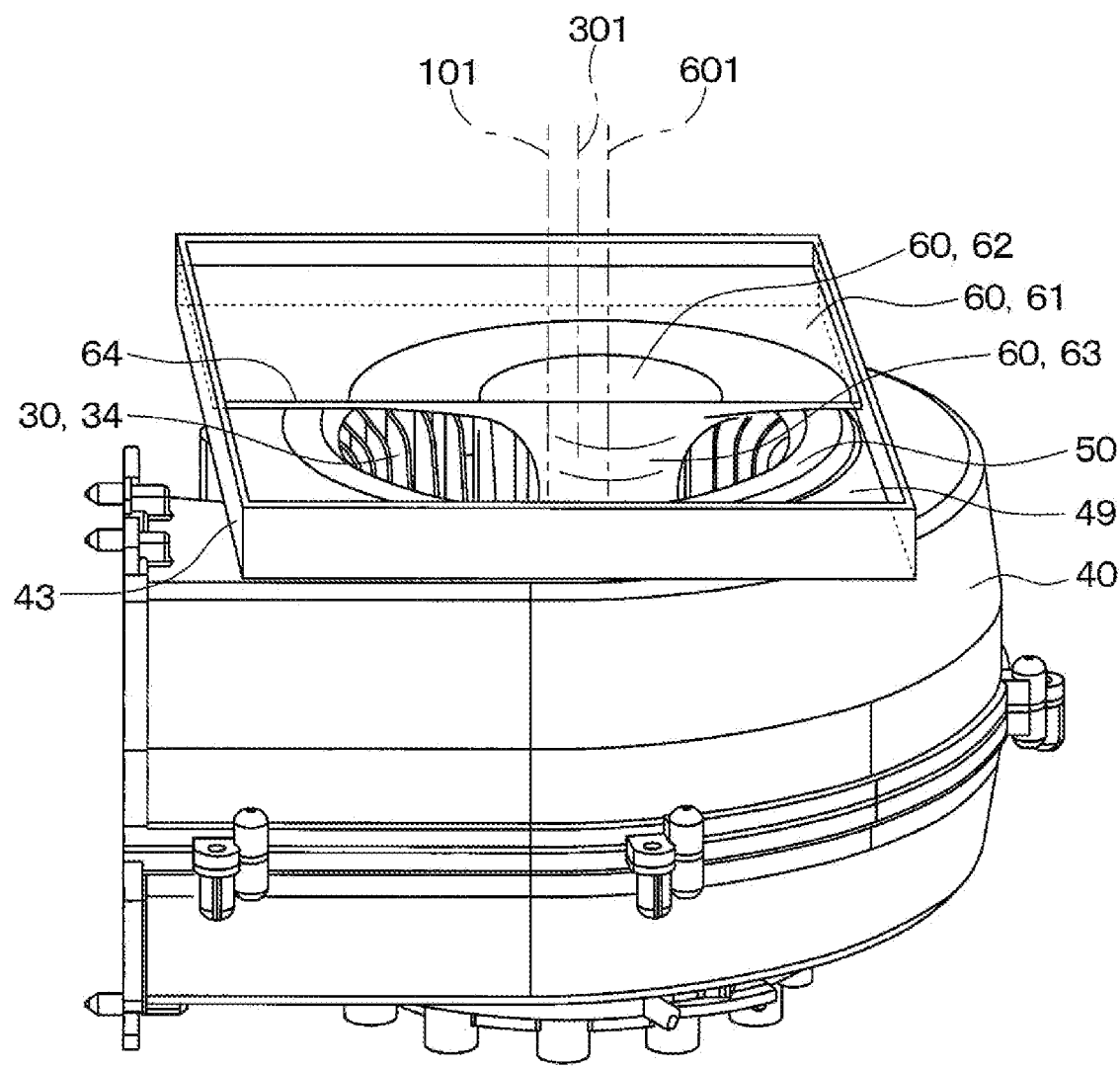
FIG. 17 is a perspective view of a centrifugal blower of an eighth embodiment without the box.
Figure 18:
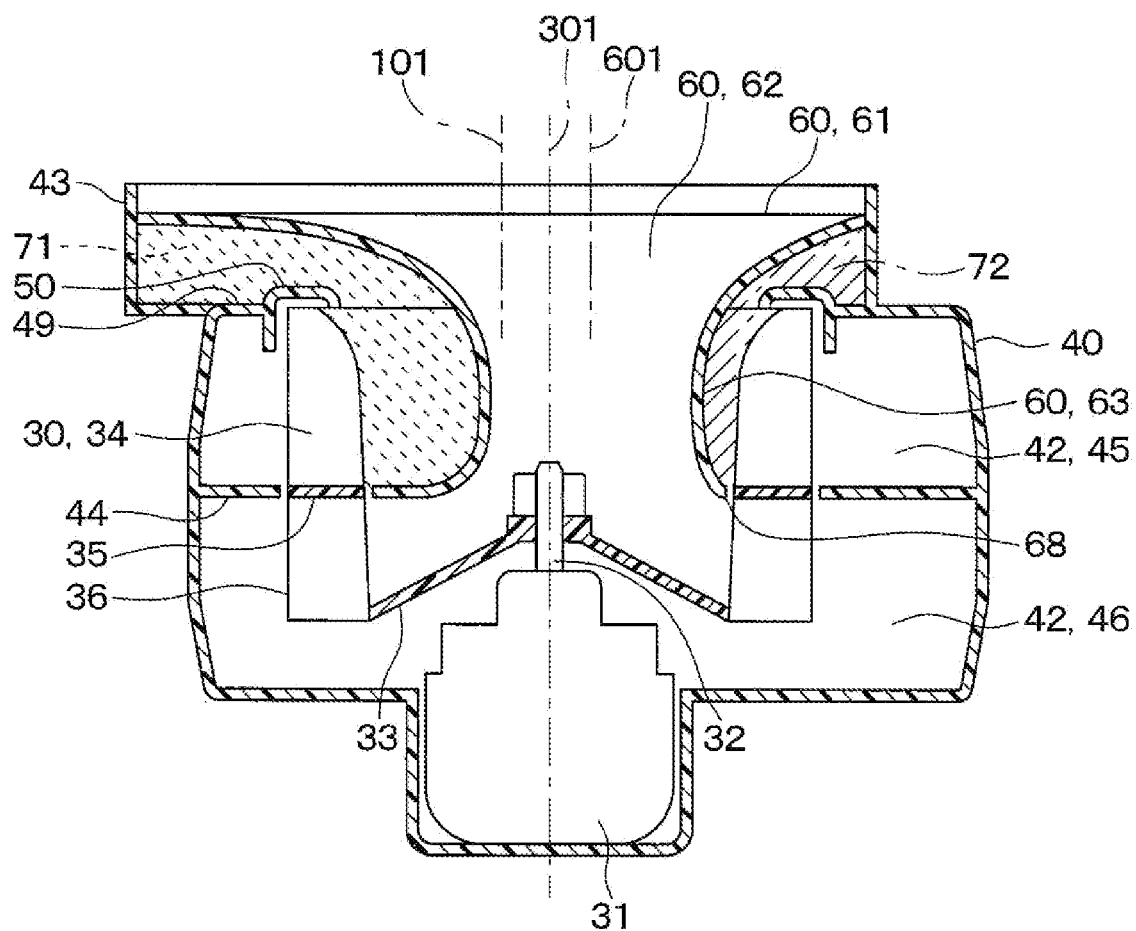
FIG. 18 is an explanatory diagram illustrating a first passage cross-section and a second passage cross-section in the centrifugal blower of the eighth embodiment.

As shown in FIGS. 17 and 18, in the eighth embodiment, the center 101 of the box 10 is offset from the rotational axis 301 of the impeller 30 toward the first passage cross-section 71 (i.e., the nose portion 41). Further, in the eighth embodiment, the center axis 601 of the tubular portion 63 of the separation tube 60 is offset from the rotational axis 301 of the impeller 30 toward the second passage cross-section 72 (i.e., away from the nose portion 41).

With the above-described configuration, also in the eighth embodiment, the area of the first passage cross-section 71 is larger than the area of the second passage cross-section 72. Specifically, a portion of the first passage cross-section 71 defined between the impeller 30 and the air introducing plate 61 is larger than a portion of the second passage cross-section 72 defined between the impeller 30 and the air introducing plate 61. Further, a portion of the first passage cross-section 71 defined radially inside of the impeller 30 is larger than a portion of the second passage cross-section 72 defined radially inside of the impeller 30. Therefore, the eighth embodiment can also achieve the same advantages as those of the first embodiment and the like.

Other Embodiments

The present disclosure is not limited to the embodiments described above, and can be modified as appropriate. The above embodiments are not independent of each other, and can be appropriately combined except when the combination is obviously impossible. Further, in each of the above-mentioned embodiments, it goes without saying that components of the embodiment are not necessarily essential except for a case in which the components are particularly clearly specified as essential components, a case in which the components are clearly considered in principle as essential components, and the like. Further, in each of the embodiments described above, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. Also, the shape, the positional relationship, and the like of the component or the like mentioned in the above embodiments are not limited to those being mentioned unless otherwise specified, limited to the specific shape, positional relationship, and the like in principle, or the like. That is, terms such as "upper", "lower", "left", "right", "front" and "rear" are used for convenience in the explanation of each embodiment and do not limit the direction in which the centrifugal blower is installed in a vehicle or the like.

For example, in the description of the first embodiment, the outside air flows into the upper passage 45 and the inside air flows into the lower passage 46. However, the present disclosure is not limited to this. The centrifugal blower 1 may be configured such that only one of the outside air and the inside air or mixed air of the outside air and the inside air flows into both of the upper passage 45 and the lower passage 46 by adjusting positions of the first switching door 14 and the second switching door 15 of the box 10.

Further, for example, in the description of the first embodiment, the nose portion 41 and the air-conditioner casing are arranged in a right side portion of the scroll casing 40 in the vehicle width direction, but the present disclosure is not limited to this. The centrifugal blower 1 may be configured such that the nose portion 41 and the air conditioner casing are arranged in a left side portion of the scroll casing 40 in the vehicle width direction.

Further, for example, in the description of the first embodiment, the box 10 defines the outside air introducing port 11, the first inside air introducing port 12, and the second inside air introducing port 13 in this order from the front side of the vehicle. However, the present disclosure is not limited to this. In the box 10, the outside air introducing port 11, the first inside air introducing port 12, and the second inside air introducing port 13 may be arranged in the vehicle width direction, or may be arranged in this order from the rear side of the vehicle, or may be arranged in a diagonal manner.

(Overview)

According to the first aspect shown in some or all of the above embodiments, a single inlet centrifugal blower is applied to an inside outside air double-laminar flow type air conditioner. The centrifugal blower is configured to separately draw the inside air and the outside air at the same time. This centrifugal blower includes a box, a filter, an impeller, a scroll casing, an annular bell mouth, a partition wall and a separation tube. The box defines an outside air introducing port through which the outside air is introduced into the box and an inside air introducing port through which the inside air is introduced into the box. The filter collects foreign matters contained in the air introduced into the box. The impeller is configured to rotate by a motor. The impeller is configured to draw the air having passed through the filter in an axial direction of the impeller and blow the air radially outward of the impeller. The scroll casing surrounds the impeller, has a nose portion on an outer circumference of the scroll casing, and defines an air passage between the scroll casing and the impeller that has an area gradually increasing from the nose portion in a circumferential direction. The annular bell mouth is disposed in a first end surface of the scroll casing in the axial direction and defines an inlet through which the air is drawn toward the impeller. The partition wall is configured to divide the air passage into an upper passage and a lower passage. The upper passage and the lower passage are arranged from a first end side of the air passage to a second end side of the air passage along the axial direction. The separation tube includes an air introducing plate and a tubular portion. The air introducing plate is disposed in an area between the impeller and the filter and defines an air inlet portion. The tubular portion extends from the air inlet portion through the impeller and then expands radially outside of the impeller. In this centrifugal blower, a portion of the air flows through the filter, flows into the air inlet portion, flows through the tubular portion, and then is discharged into the lower passage by the impeller. A portion of the air flows through the filter, flows through an area that is outside of the air introducing plate, and flows through outside of the tubular portion, and then is discharged into the upper passage by the impeller. Here, a virtual plane is defined as a plane that is parallel to a rotational axis of the impeller and an outer edge of the air introducing plate is on the virtual plane. A passage through which air flows from the filter to the upper passage has a cross-section on the virtual plane and the cross-section is divided by the separation tube into a first passage cross-section and a second passage cross-section. The first passage cross-section is closer to the nose portion than the second passage cross-section is to the nose portion. The first passage cross-section is larger than the second passage cross-section.

According to the second aspect, the center of the box is offset from both the rotational axis of the impeller and the center axis of the tubular portion of the separation tube toward the first passage cross-section. As a result, a portion of the first passage cross-section defined between the impeller and the air introducing plate is larger than a portion of the second passage cross-section defined between the impeller and the air introducing plate.

According to this, areas of the first passage cross-section and the second passage cross-section can be adjusted without significantly changing a size of the centrifugal blower in the axial direction of the impeller and configurations of the box and the separation tube.

According to the third aspect, the air introducing plate includes a first portion defining the first passage cross-section, a second portion defining the second passage cross-section and being offset from the first portion toward the bell mouth, and a connecting portion connecting between the first portion and the second portion. As a result, a portion of the first passage cross-section defined between the impeller and the air introducing plate is larger than a portion of the second passage cross-section defined between the impeller and the air introducing plate.

According to the fourth aspect, the air introducing plate has a first portion defining the first passage cross-section and a second portion defining the second passage cross-section. The air introducing plate is tilted toward the bell mouth from the first portion to the second portion. As a result, a portion of the first passage cross-section defined between the impeller and the air introducing plate is larger than a portion of the second passage defined between the impeller and the air introducing plate.

According to the fifth aspect, the air introducing plate has an area located radially outside of the air inlet portion. The area of the air introducing plate is sloped in a circumferential direction of the air inlet portion with a constant gradient relative to the bell mouth. As a result, the pressure loss of the air flowing through a passage on a far side of the tubular portion in the circumferential direction can be reduced.

According to the sixth aspect, the air introducing plate includes a first connecting curved portion that is connected to the tubular portion and defines the first passage cross-section and a second connecting curved portion that is connected to the tubular portion and defines the second passage cross-section. The first connecting curved portion has a radius of curvature that is less than a radius of curvature of the second connecting curved portion. As a result, a portion of the first passage cross-section defined between the impeller and the air introducing plate is larger than a portion of the second passage cross-section defined between the impeller and the air introducing plate.

According to the seventh aspect, the center axis of the tubular portion of the separation tube is offset from both the rotational axis of the impeller and the center of the box away from the nose portion. Thereby, the first passage cross-section is larger than the second passage cross-section.

According to this, the areas of the first passage cross-section and the second passage cross-section can be adjusted without significantly changing a size of the centrifugal blower in the axial direction of the impeller (e.g., a height dimension) and a size of the centrifugal blower in a perpendicular direction to the rotational axis of the impeller (e.g., a width dimension).

According to the eighth aspect, the center of the box is offset from the rotational axis of the impeller toward the nose portion and a center axis of the tubular portion of the separation tube is offset from the rotational axis away from the nose portion. Thereby, the area of the first passage cross-section is larger than the area of the second passage cross-section.

According to the ninth aspect, an outer edge of the air introducing plate and an outer edge of the box extends away from an outer edge of the scroll casing. An outside passage is defined at a position radially outside of the scroll casing and includes an area defined on a side of the bell mouth opposite to the air introducing plate. As a result, a portion of the air having passed through the filter is drawn into the impeller through the first passage cross-section into the outside passage. Thereby, the area of the first passage cross-section is larger than the area of the second passage cross-section.

What is claimed is:

1. A centrifugal blower for an air conditioner, the centrifugal blower being configured to separately draw an inside air and an outside air at the same time, the centrifugal blower comprising:
   a box defining an outside air introducing port through which the outside air is introduced into the box and an inside air introducing port through which the inside air is introduced into the box;
   a filter configured to collect foreign matters in the air introduced into the box;
   an impeller configured to rotate by a motor, the impeller being configured to draw the air having passed through the filter in an axial direction of the impeller and blow the air radially outward of the impeller;
   a scroll casing surrounding the impeller, having a nose portion on an outer circumference of the scroll casing, and defining an air passage between the scroll casing and the impeller, the air passage having an area increasing from the nose portion in a circumferential direction;
   an annular bell mouth disposed in a first end surface of the scroll casing in the axial direction, the annular bell mouth defining an inlet through which the air is drawn toward the impeller;
   a partition wall configured to divide the air passage into an upper passage and a lower passage, the upper passage and the lower passage being arranged from a first end side of the air passage to a second end side of the air passage along the axial direction; and
   a separation tube including:
      an air introducing plate that is disposed in an area between the impeller and the filter to partially cover the impeller and that defines an air inlet portion; and
      a tubular portion that extends from the air inlet portion through the impeller, wherein
   the centrifugal blower is configured such that
      a portion of the air flows through the filter toward the air introducing plate, flows into the air inlet portion, flows through the tubular portion, and then is discharged into the lower passage by the impeller, and
      a portion of the air flows through the filter, flows through an area that is outside of the air introducing plate, flows through outside of the tubular portion, and is discharged into the upper passage by the impeller,
   a virtual plane is defined as a plane that is parallel to a rotational axis of the impeller and an outer edge of the air introducing plate is on the virtual plane,
   a passage through which air flows from the filter to the upper passage has a cross-section on the virtual plane that is divided by the separation tube into a first passage cross-section and a second passage cross-section,
   the first passage cross-section is closer to the nose portion than the second passage cross-section is to the nose portion, and
   the first passage cross-section is larger than the second passage cross-section.

2. The centrifugal blower according to claim 1, wherein the box has a center that is offset from both the rotational axis of the impeller and a center axis of the tubular portion of the separation tube toward the nose portion, and
   a portion of the first passage cross-section defined between the impeller and the air introducing plate is larger than a portion of the second passage cross-section defined between the impeller and the air introducing plate.

3. The centrifugal blower according to claim 1, wherein the air introducing plate includes:
   a first portion defining the first passage cross-section;
   a second portion defining the second passage cross-section and being offset from the first portion toward the annular bell mouth; and
   a connecting portion connecting between the first portion and the second portion, and
   a portion of the first passage cross-section defined between the impeller and the air introducing plate is larger than a portion of the second passage cross-section defined between the impeller and the air introducing plate.

4. The centrifugal blower according to claim 1, wherein the air introducing plate has a first portion defining the first passage cross-section and a second portion defining the second passage cross-section, and
   the air introducing plate is tilted toward the annular bell mouth from the first portion to the second portion, and
   a portion of the first passage cross-section defined between the impeller and the air introducing plate is larger than a portion of the second passage cross-section defined between the impeller and the air introducing plate.

5. The centrifugal blower according to claim 4, wherein the air introducing plate has an area located radially outside of the air inlet portion, and
   the area of the air introducing plate is sloped in a circumferential direction of the air inlet portion with a constant gradient relative to the annular bell mouth.

6. The centrifugal blower according to claim 1, wherein the air introducing plate includes a first connecting curved portion that is connected to the tubular portion and defines the first passage cross-section and a second connecting curved portion that is connected to the tubular portion and defines the second passage cross-section,
   the first connecting curved portion has a radius of curvature that is less than a radius of curvature of the second connecting curved portion, and
   a portion of the first passage cross-section defined between the impeller and the air introducing plate is larger than a portion of the second passage cross-section defined between the impeller and the air introducing plate.

7. The centrifugal blower according to claim 1, wherein the tubular portion of the separation tube has a center axis that is offset from both the rotational axis of the impeller and a center of the box away from the nose portion.

8. The centrifugal blower according to claim 1, wherein the box has a center that is offset from the rotational axis of the impeller toward the nose portion, and
   the tubular portion of the separation tube has a center axis that is offset from the rotational axis away from the nose portion.

9. The centrifugal blower according to claim 1, wherein an outer edge of the air introducing plate and an outer edge of the box extend away from an outer edge of the scroll casing to define an outside passage that is located at a position radially outside of the scroll casing and that includes an area defined on a side of the annular bell mouth opposite to the air introducing plate, and a portion of the air flows through the filter, flows through the first passage cross-section into the outside passage, and is drawn into the impeller.

10. The centrifugal blower according to claim 1, wherein the virtual plane is divided into a first virtual plane and a second virtual plane by the rotational axis, a projection point of the nose portion that is projected onto the virtual plane is on the first virtual plane, and the first cross-section is on the first virtual plane and the second cross-section is on the second virtual plane.

11. The centrifugal blower according to claim 1, wherein the area of the air passage formed by the scroll casing increases from the nose portion to one side in the circumferential direction, and a circumferential distance of the first passage cross-section from the nose portion to the one side in the circumferential direction is smaller than a circumferential distance of the second passage cross-section from the nose portion to the one side in the circumferential direction.

* * * * *